(12) United States Patent
Nakano et al.

(10) Patent No.: US 7,268,537 B2
(45) Date of Patent: Sep. 11, 2007

(54) ROTATION ANGLE DETECTION DEVICE THAT CONVERTS M-PHASE WINDINGS INTO TWO-PHASE WINDINGS AND DYNAMO-ELECTRIC MACHINE USING THE SAME

(75) Inventors: Masatsugu Nakano, Tokyo (JP); Shinji Nishimura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/510,486

(22) PCT Filed: Apr. 15, 2003

(86) PCT No.: PCT/JP03/04779

§ 371 (c)(1), (2), (4) Date: Oct. 7, 2004

(87) PCT Pub. No.: WO03/087728

PCT Pub. Date: Oct. 23, 2003

(65) Prior Publication Data

US 2005/0093538 A1     May 5, 2005

(30) Foreign Application Priority Data

Apr. 15, 2002    (JP)   ............................. 2002-111800

(51) Int. Cl.
*G01B 7/30*    (2006.01)
*H02K 11/00*    (2006.01)

(52) U.S. Cl. ........................... 324/207.25; 324/207.17; 310/68 B

(58) Field of Classification Search ........... 324/207.17, 324/207.25; 310/68 B
See application file for complete search history.

(56) References Cited

U.S. PATENT DOCUMENTS

| | | | |
|---|---|---|---|
| 4,631,510 A | 12/1986 | Nagarkatti et al. | |
| 5,446,966 A | 9/1995 | Ishizaki | |
| 5,757,182 A * | 5/1998 | Kitazawa | 324/207.17 |
| 5,866,964 A * | 2/1999 | Li | 310/198 |
| 6,891,365 B2 * | 5/2005 | Nakano et al. | 324/207.25 |

FOREIGN PATENT DOCUMENTS

| | | |
|---|---|---|
| EP | 0 522 941 A1 | 1/1993 |
| EP | 595448 A1 * | 5/1994 |
| JP | 49-124508 A | 11/1974 |
| JP | 59-56859 A | 4/1984 |
| JP | 59056859 A * | 4/1984 |

* cited by examiner

*Primary Examiner*—Edward Lefkowitz
*Assistant Examiner*—David M Schindler
(74) *Attorney, Agent, or Firm*—Sughrue Mion Pllc

(57) ABSTRACT

Disclosed are a rotation angle detection device including: a stator provided with a one-phase excitation winding and two-phase output windings; and a rotor having salient poles, and a dynamo-electric machine using the same. The two-phase output windings are wound around a plurality of teeth of the stator, and respective numbers of turns of the two-phase output windings are obtained by using m-phase windings (m is an integer of 3 or more) imaginarily defined to convert the numbers of turns of the m-phase windings into those of two-phase windings. Thus, since the number of phases decreases compared with the case in which the windings are structured with m phases, a structure is simplified, and a manufacturing process is facilitated.

14 Claims, 68 Drawing Sheets

FIG. 5

| TEETH NUMBER | 1 | 2 | 3 | 4 | 5 | 6 | 7 | 8 | 9 | 10 |
|---|---|---|---|---|---|---|---|---|---|---|
| EXCITATION WINDING | 1.0 | -1.0 | 1.0 | -1.0 | 1.0 | -1.0 | 1.0 | -1.0 | 1.0 | -1.0 |
| FIRST PHASE | 1.0 | 0.0 | 0.0 | 0.0 | -1.0 | 0.0 | -1.0 | 0.0 | 0.0 | 0.0 |
| SECOND PHASE | 0.0 | 0.0 | -1.0 | 0.0 | -1.0 | 0.0 | 1.0 | 0.0 | 1.0 | 0.0 |
| THIRD PHASE | -1.0 | 0.0 | -1.0 | 0.0 | 0.0 | 0.0 | 0.0 | 0.0 | 0.0 | 0.0 |
| FOURTH PHASE | -1.0 | 0.0 | 0.0 | 0.0 | 1.0 | 0.0 | -1.0 | 0.0 | -1.0 | 0.0 |
| FIFTH PHASE | 0.0 | 0.0 | 1.0 | 0.0 | 0.0 | 0.0 | -1.0 | 0.0 | -1.0 | 0.0 |

F I G. 6

| TEETH NUMBER | 1 | 2 | 3 | 4 | 5 | 6 | 7 | 8 | 9 | 10 |
|---|---|---|---|---|---|---|---|---|---|---|
| EXCITATION WINDING | 1.0 | -1.0 | 1.0 | -1.0 | 1.0 | -1.0 | 1.0 | -1.0 | 1.0 | -1.0 |
| α-PHASE WINDING | 2.6180 | 0.0000 | 0.8090 | 0.0000 | -2.1180 | 0.0000 | -2.1180 | 0.0000 | 0.8090 | 0.0000 |
| β-PHASE WINDING | 0.0000 | 0.0000 | -2.4899 | 0.0000 | -1.5388 | 0.0000 | 1.5388 | 0.0000 | 2.4899 | 0.0000 |

FIG. 7

| TEETH NUMBER | 1 | 2 | 3 | 4 | 5 | 6 | 7 | 8 | 9 | 10 |
|---|---|---|---|---|---|---|---|---|---|---|
| EXCITATION WINDING | 50 | -50 | 50 | -50 | 50 | -50 | 50 | -50 | 50 | -50 |
| α-PHASE WINDING | 261.80 | 0.00 | 80.90 | 0.00 | -211.80 | 0.00 | 211.80 | 0.00 | 80.90 | 0.00 |
| β-PHASE WINDING | 0.00 | 0.00 | -248.99 | 0.00 | -153.88 | 0.00 | 153.88 | 0.00 | 248.99 | 0.00 |

FIG. 8

| TEETH NUMBER | 1 | 2 | 3 | 4 | 5 | 6 | 7 | 8 | 9 | 10 |
|---|---|---|---|---|---|---|---|---|---|---|
| EXCITATION WINDING | 50 | -50 | 50 | -50 | 50 | -50 | 50 | -50 | 50 | -50 |
| α-PHASE WINDING | 262 | 0 | 81 | 0 | -212 | 0 | -212 | 0 | 81 | 0 |
| β-PHASE WINDING | 0 | 0 | -249 | 0 | -154 | 0 | 154 | 0 | 249 | 0 |

F I G. 1 4
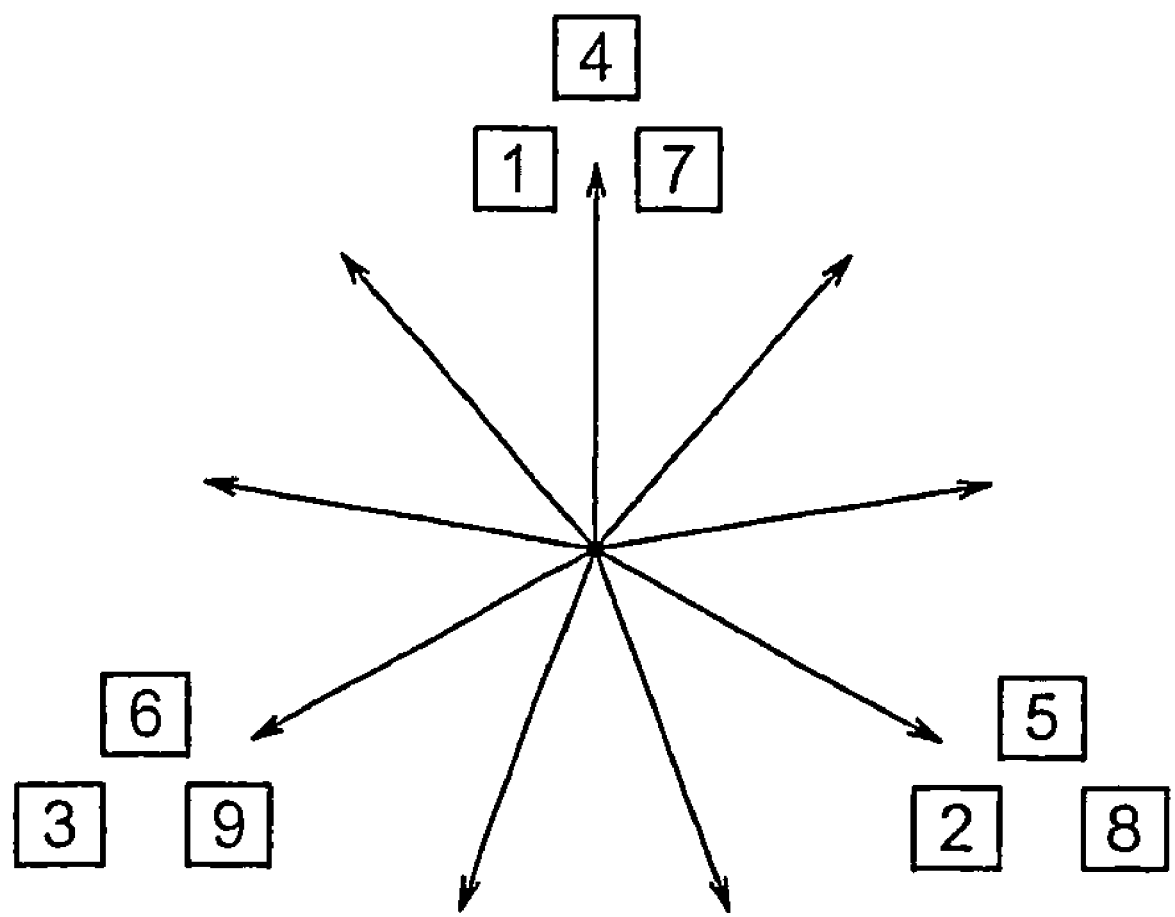

FIG. 15

| TEETH NUMBER | 1 | 2 | 3 | 4 | 5 | 6 | 7 | 8 | 9 |
|---|---|---|---|---|---|---|---|---|---|
| EXCITATION WINDING | 1.0 | -0.5 | -0.5 | 1.0 | -0.5 | -0.5 | 1.0 | -0.5 | -0.5 |
| U-PHASE | 1.0 | 0.0 | 0.0 | 0.0 | -1.0 | -1.0 | 0.0 | 0.0 | 0.0 |
| V-PHASE | 0.0 | 0.0 | 0.0 | 1.0 | 0.0 | 0.0 | 0.0 | -1.0 | -1.0 |
| W-PHASE | 0.0 | -1.0 | -1.0 | 0.0 | 0.0 | 0.0 | 1.0 | 0.0 | 0.0 |

FIG. 16

| TEETH NUMBER | 1 | 2 | 3 | 4 | 5 | 6 | 7 | 8 | 9 |
|---|---|---|---|---|---|---|---|---|---|
| EXCITATION WINDING | 1.0000 | -0.5000 | -0.5000 | 1.0000 | -0.5000 | -0.5000 | 1.0000 | -0.5000 | -0.5000 |
| α-PHASE WINDING | 0.8165 | 0.4082 | 0.4082 | -0.4082 | -0.8165 | -0.8165 | -0.4082 | 0.4082 | 0.4082 |
| β-PHASE WINDING | 0.0000 | 0.7071 | 0.7071 | 0.7071 | 0.0000 | 0.0000 | -0.7071 | -0.7071 | -0.7071 |

FIG. 17

| TEETH NUMBER | 1 | 2 | 3 | 4 | 5 | 6 | 7 | 8 | 9 |
|---|---|---|---|---|---|---|---|---|---|
| EXCITATION WINDING | 50.00 | -25.00 | -25.00 | 50.00 | -25.00 | -25.00 | 50.00 | -25.00 | -25.00 |
| α-PHASE WINDING | 122.47 | 61.24 | 61.24 | -61.24 | -122.47 | -122.47 | -61.24 | 61.24 | 61.24 |
| β-PHASE WINDING | 0.00 | 106.07 | 106.07 | 106.07 | 0.00 | 0.00 | -106.07 | -106.07 | -106.07 |

F I G. 1 8

| TEETH NUMBER | 1 | 2 | 3 | 4 | 5 | 6 | 7 | 8 | 9 |
|---|---|---|---|---|---|---|---|---|---|
| EXCITATION WINDING | 50 | -25 | -25 | 50 | -25 | -25 | 50 | -25 | -25 |
| α-PHASE WINDING | 122 | 61 | 61 | -61 | -122 | -122 | -61 | 61 | 61 |
| β-PHASE WINDING | 0 | 106 | 106 | 106 | 0 | 0 | -106 | -106 | -106 |

FIG. 22

| TEETH NUMBER | 1 | 2 | 3 | 4 | 5 | 6 | 7 | 8 | 9 |
|---|---|---|---|---|---|---|---|---|---|
| EXCITATION WINDING | 1.0 | -0.5 | -0.5 | 1.0 | -0.5 | -0.5 | 1.0 | -0.5 | -0.5 |
| U-PHASE | 1.0 | 0.0 | 0.0 | 0.0 | -1.0 | -1.0 | 0.0 | 0.0 | 0.0 |
| V-PHASE | 0.0 | -1.0 | -1.0 | 0.0 | 0.0 | 0.0 | 1.0 | 0.0 | 0.0 |
| W-PHASE | 0.0 | 0.0 | 0.0 | 1.0 | 0.0 | 0.0 | 0.0 | -1.0 | -1.0 |

F I G. 23

| TEETH NUMBER | 1 | 2 | 3 | 4 | 5 | 6 | 7 | 8 | 9 |
|---|---|---|---|---|---|---|---|---|---|
| EXCITATION WINDING | 1.0000 | -0.5000 | -0.5000 | 1.0000 | -0.5000 | -0.5000 | 1.0000 | -0.5000 | -0.5000 |
| α-PHASE WINDING | 0.8165 | 0.4082 | 0.4082 | -0.4082 | -0.8165 | -0.8165 | -0.4082 | 0.4082 | 0.4082 |
| β-PHASE WINDING | 0.0000 | -0.7071 | -0.7071 | -0.7071 | 0.0000 | 0.0000 | 0.7071 | 0.7071 | 0.7071 |

FIG. 24

| TEETH NUMBER | 1 | 2 | 3 | 4 | 5 | 6 | 7 | 8 | 9 |
|---|---|---|---|---|---|---|---|---|---|
| EXCITATION WINDING | 50.00 | -25.00 | -25.00 | 50.00 | -25.00 | -25.00 | 50.00 | -25.00 | -25.00 |
| α-PHASE WINDING | 122.47 | 61.24 | 61.24 | -61.24 | -122.47 | -122.47 | -61.24 | 61.24 | 61.24 |
| β-PHASE WINDING | 0.00 | -106.07 | -106.07 | -106.07 | 0.00 | 0.00 | 106.07 | 106.07 | 106.07 |

FIG. 25

| TEETH NUMBER | 1 | 2 | 3 | 4 | 5 | 6 | 7 | 8 | 9 |
|---|---|---|---|---|---|---|---|---|---|
| EXCITATION WINDING | 50 | -25 | -25 | 50 | -25 | -25 | 50 | -25 | -25 |
| α-PHASE WINDING | 122 | 61 | 61 | -61 | -122 | -122 | -61 | 61 | 61 |
| β-PHASE WINDING | 0 | -106 | -106 | -106 | 0 | 0 | 106 | 106 | 106 |

FIG. 29

| TEETH NUMBER | 1 | 2 | 3 | 4 | 5 | 6 |
|---|---|---|---|---|---|---|
| EXCITATION WINDING | 1.0 | -1.0 | 1.0 | -1.0 | 1.0 | -1.0 |
| U-PHASE | 1.0 | 1.0 | 1.0 | 0.0 | 0.0 | 0.0 |
| V-PHASE | 0.0 | 0.0 | 1.0 | 1.0 | 1.0 | 0.0 |
| W-PHASE | 1.0 | 0.0 | 0.0 | 0.0 | 1.0 | 1.0 |

FIG. 30

| TEETH NUMBER | 1 | 2 | 3 | 4 | 5 | 6 |
|---|---|---|---|---|---|---|
| EXCITATION WINDING | 1.0000 | -1.0000 | 1.0000 | -1.0000 | 1.0000 | -1.0000 |
| α-PHASE WINDING | 0.4082 | 0.8165 | 0.4082 | -0.4082 | -0.8165 | -0.4082 |
| β-PHASE WINDING | -0.7071 | 0.0000 | 0.7071 | 0.7071 | 0.0000 | -0.7071 |

FIG. 31

| TEETH NUMBER | 1 | 2 | 3 | 4 | 5 | 6 |
|---|---|---|---|---|---|---|
| EXCITATION WINDING | 50 | -50 | 50 | -50 | 50 | -50 |
| α-PHASE WINDING | 61 | 122 | 61 | -61 | -122 | -61 |
| β-PHASE WINDING | -106 | 0 | 106 | 106 | 0 | -106 |

FIG. 34

| TEETH NUMBER | 1 | 2 | 3 | 4 | 5 | 6 |
|---|---|---|---|---|---|---|
| EXCITATION WINDING | 1.0 | -1.0 | 1.0 | -1.0 | 1.0 | -1.0 |
| U-PHASE | 1.0 | 1.0 | 1.0 | 0.0 | 0.0 | 0.0 |
| V-PHASE | 1.0 | 0.0 | 0.0 | 0.0 | 1.0 | 1.0 |
| W-PHASE | 0.0 | 0.0 | 1.0 | 1.0 | 1.0 | 0.0 |

FIG. 35

| TEETH NUMBER | 1 | 2 | 3 | 4 | 5 | 6 |
|---|---|---|---|---|---|---|
| EXCITATION WINDING | 1.0000 | -1.0000 | 1.0000 | -1.0000 | 1.0000 | -1.0000 |
| α-PHASE WINDING | 0.4082 | 0.8165 | 0.4082 | -0.4082 | -0.8165 | -0.4082 |
| β-PHASE WINDING | 0.7071 | 0.0000 | -0.7071 | -0.7071 | 0.0000 | 0.7071 |

FIG. 36

| TEETH NUMBER | 1 | 2 | 3 | 4 | 5 | 6 |
|---|---|---|---|---|---|---|
| EXCITATION WINDING | 50 | -50 | 50 | -50 | 50 | -50 |
| α-PHASE WINDING | 61 | 122 | 61 | -61 | -122 | -61 |
| β-PHASE WINDING | 106 | 0 | -106 | -106 | 0 | 106 |

FIG. 39

| TEETH NUMBER | 1 | 2 | 3 | 4 | 5 | 6 | 7 | 8 | 9 |
|---|---|---|---|---|---|---|---|---|---|
| EXCITATION WINDING | 1.0 | -0.5 | -0.5 | 1.0 | -0.5 | -0.5 | 1.0 | -0.5 | -0.5 |
| U-PHASE | 1.0 | -1.0 | 0.0 | 0.0 | 0.0 | 0.0 | 0.0 | 0.0 | -1.0 |
| V-PHASE | 0.0 | 0.0 | 0.0 | 0.0 | 0.0 | -1.0 | 1.0 | -1.0 | 0.0 |
| W-PHASE | 0.0 | 0.0 | -1.0 | 1.0 | -1.0 | 0.0 | 0.0 | 0.0 | 0.0 |

FIG. 40

| TEETH NUMBER | 1 | 2 | 3 | 4 | 5 | 6 | 7 | 8 | 9 |
|---|---|---|---|---|---|---|---|---|---|
| EXCITATION WINDING | 1.0000 | -0.5000 | -0.5000 | 1.0000 | -0.5000 | -0.5000 | 1.0000 | -0.5000 | -0.5000 |
| α-PHASE WINDING | 0.8165 | -0.8165 | 0.4082 | -0.4082 | 0.4082 | 0.4082 | -0.4082 | 0.4082 | -0.8165 |
| β-PHASE WINDING | 0.0000 | 0.0000 | 0.7071 | -0.7071 | 0.7071 | -0.7071 | 0.7071 | -0.7071 | 0.0000 |

F I G. 4 1

| TEETH NUMBER | 1 | 2 | 3 | 4 | 5 | 6 | 7 | 8 | 9 |
|---|---|---|---|---|---|---|---|---|---|
| EXCITATION WINDING | 50 | -25 | -25 | 50 | -25 | -25 | 50 | -25 | -25 |
| α-PHASE WINDING | 122 | -122 | 61 | -61 | 61 | 61 | -61 | 61 | -122 |
| β-PHASE WINDING | 0 | 0 | 106 | -106 | 106 | -106 | 106 | -106 | 0 |

F I G. 44

| TEETH NUMBER | 1 | 2 | 3 | 4 | 5 | 6 | 7 | 8 | 9 | 10 | 11 | 12 |
|---|---|---|---|---|---|---|---|---|---|---|---|---|
| EXCITATION WINDING | 1.0 | 1.0 | -1.0 | -1.0 | 1.0 | 1.0 | -1.0 | -1.0 | 1.0 | 1.0 | -1.0 | -1.0 |
| U-PHASE WINDING | 1.0 | 1.0 | 1.0 | 0.0 | 0.0 | 0.0 | 0.0 | 0.0 | 0.0 | 0.0 | 0.0 | 0.0 |
| V-PHASE WINDING | 0.0 | 0.0 | 0.0 | 0.0 | 1.0 | 1.0 | 1.0 | 0.0 | 0.0 | 0.0 | 0.0 | 0.0 |
| W-PHASE WINDING | 0.0 | 0.0 | 0.0 | 0.0 | 0.0 | 0.0 | 0.0 | 0.0 | 1.0 | 1.0 | 1.0 | 0.0 |

F I G. 45

| TEETH NUMBER | 1 | 2 | 3 | 4 | 5 | 6 | 7 | 8 | 9 | 10 | 11 | 12 |
|---|---|---|---|---|---|---|---|---|---|---|---|---|
| EXCITATION WINDING | 1.0 | 1.0 | -1.0 | -1.0 | 1.0 | 1.0 | -1.0 | -1.0 | 1.0 | 1.0 | -1.0 | -1.0 |
| α-PHASE WINDING | 0.8165 | 0.8165 | 0.8165 | 0.0000 | -0.4082 | -0.4082 | -0.4082 | 0.0000 | -0.4082 | -0.4082 | -0.4082 | 0.0000 |
| β-PHASE WINDING | 0.0000 | 0.0000 | 0.0000 | 0.0000 | 0.7071 | 0.7071 | 0.7071 | 0.0000 | -0.7071 | -0.7071 | -0.7071 | 0.0000 |

FIG. 46

| TEETH NUMBER | 1 | 2 | 3 | 4 | 5 | 6 | 7 | 8 | 9 | 10 | 11 | 12 |
|---|---|---|---|---|---|---|---|---|---|---|---|---|
| EXCITATION WINDING | 1.0 | 1.0 | -1.0 | -1.0 | 1.0 | 1.0 | -1.0 | -1.0 | 1.0 | 1.0 | -1.0 | -1.0 |
| α-PHASE WINDING | 122 | 122 | 122 | 0 | -61 | -61 | -61 | 0 | -61 | -61 | -61 | 0 |
| β-PHASE WINDING | 0 | 0 | 0 | 0 | 106 | 106 | 106 | 0 | -106 | -106 | -106 | 0 |

FIG. 49

| TEETH NUMBER | 1 | 2 | 3 | 4 | 5 | 6 | 7 | 8 | 9 | 10 | 11 | 12 |
|---|---|---|---|---|---|---|---|---|---|---|---|---|
| EXCITATION WINDING | 1.0 | 1.0 | -1.0 | -1.0 | 1.0 | 1.0 | -1.0 | -1.0 | 1.0 | 1.0 | -1.0 | -1.0 |
| U-PHASE WINDING | 1.0 | 1.0 | 1.0 | 0.0 | 0.0 | 0.0 | 0.0 | 0.0 | 0.0 | 0.0 | 0.0 | 0.0 |
| V-PHASE WINDING | 0.0 | 0.0 | 0.0 | 0.0 | 1.0 | 1.0 | 1.0 | 0.0 | 1.0 | 1.0 | 1.0 | 0.0 |
| W-PHASE WINDING | 0.0 | 0.0 | 0.0 | 0.0 | 0.0 | 0.0 | 0.0 | 0.0 | 0.0 | 0.0 | 0.0 | 0.0 |

F I G. 5 0

| TEETH NUMBER | 1 | 2 | 3 | 4 | 5 | 6 | 7 | 8 | 9 | 10 | 11 | 12 |
|---|---|---|---|---|---|---|---|---|---|---|---|---|
| EXCITATION WINDING | 1.0 | 1.0 | -1.0 | -1.0 | 1.0 | 1.0 | -1.0 | -1.0 | 1.0 | 1.0 | -1.0 | -1.0 |
| α-PHASE WINDING | 0.8165 | 0.8165 | 0.8165 | 0.0000 | -0.4082 | -0.4082 | -0.4082 | 0.0000 | -0.4082 | -0.4082 | -0.4082 | 0.0000 |
| β-PHASE WINDING | 0.0000 | 0.0000 | 0.0000 | 0.0000 | -0.7071 | -0.7071 | -0.7071 | 0.0000 | 0.7071 | 0.7071 | 0.7071 | 0.0000 |

F I G. 5 1

| TEETH NUMBER | 1 | 2 | 3 | 4 | 5 | 6 | 7 | 8 | 9 | 10 | 11 | 12 |
|---|---|---|---|---|---|---|---|---|---|---|---|---|
| EXCITATION WINDING | 1.0 | 1.0 | -1.0 | -1.0 | 1.0 | 1.0 | -1.0 | -1.0 | 1.0 | 1.0 | -1.0 | -1.0 |
| α-PHASE WINDING | 122 | 122 | 122 | 0 | -61 | -61 | -61 | 0 | -61 | -61 | -61 | 0 |
| β-PHASE WINDING | 0 | 0 | 0 | 0 | -106 | -106 | -106 | 0 | 106 | 106 | 106 | 0 |

FIG. 55

| TEETH NUMBER | 1 | 2 | 3 | 4 | 5 | 6 | 7 | 8 | 9 |
|---|---|---|---|---|---|---|---|---|---|
| EXCITATION WINDING | 1.0 | -0.5 | -0.5 | 1.0 | -0.5 | -0.5 | 1.0 | -0.5 | -0.5 |
| U-PHASE WINDING | $2\cos\frac{4\pi}{9}$ | 0.0 | 0.0 | 0.0 | -1.0 | -1.0 | 0.0 | 0.0 | 0.0 |
| V-PHASE WINDING | 0.0 | 0.0 | 0.0 | $2\cos\frac{4\pi}{9}$ | 0.0 | 0.0 | 0.0 | -1.0 | -1.0 |
| W-PHASE WINDING | 0.0 | -1.0 | -1.0 | 0.0 | 0.0 | 0.0 | $2\cos\frac{4\pi}{9}$ | 0.0 | 0.0 |

FIG. 56

| TEETH NUMBER | 1 | 2 | 3 | 4 | 5 | 6 | 7 | 8 | 9 |
|---|---|---|---|---|---|---|---|---|---|
| EXCITATION WINDING | 1.0 | -0.5 | -0.5 | 1.0 | -0.5 | -0.5 | 1.0 | -0.5 | -0.5 |
| α-PHASE WINDING | 0.2836 | 0.4082 | 0.4082 | -0.1418 | -0.8165 | -0.8165 | -0.1418 | 0.4082 | 0.4082 |
| β-PHASE WINDING | 0.0000 | 0.7071 | 0.7071 | 0.2456 | 0.0000 | 0.0000 | -0.2456 | -0.7071 | -0.7071 |

F I G. 57

| TEETH NUMBER | 1 | 2 | 3 | 4 | 5 | 6 | 7 | 8 | 9 |
|---|---|---|---|---|---|---|---|---|---|
| EXCITATION WINDING | 50 | -25 | -25 | 50 | -25 | -25 | 50 | -25 | -25 |
| α-PHASE WINDING | 43 | 61 | 61 | -21 | -122 | -122 | -21 | 61 | 61 |
| β-PHASE WINDING | 0 | 106 | 106 | 37 | 0 | 0 | -37 | -106 | -106 |

F I G. 6 0
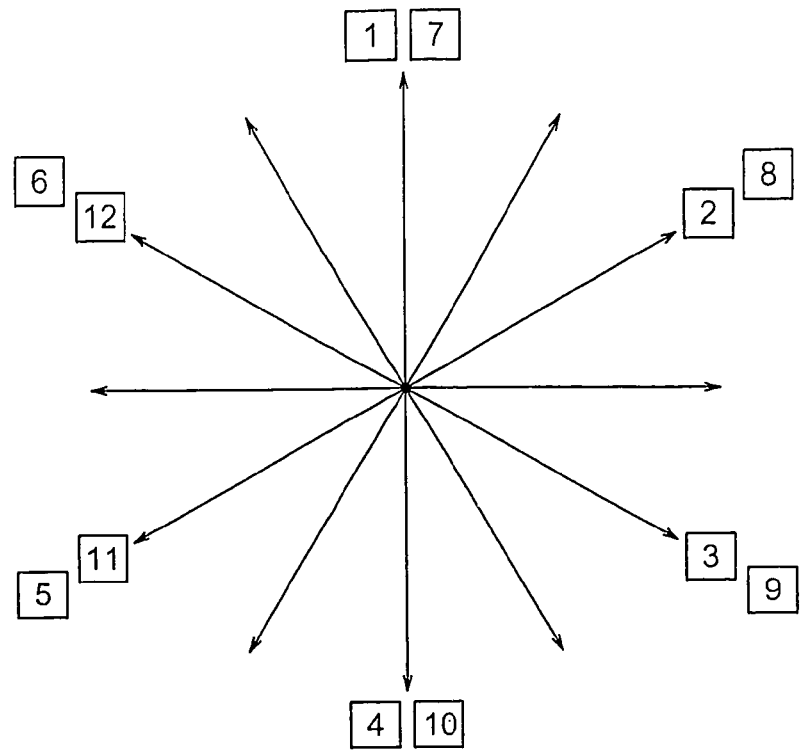
F I G. 6 1
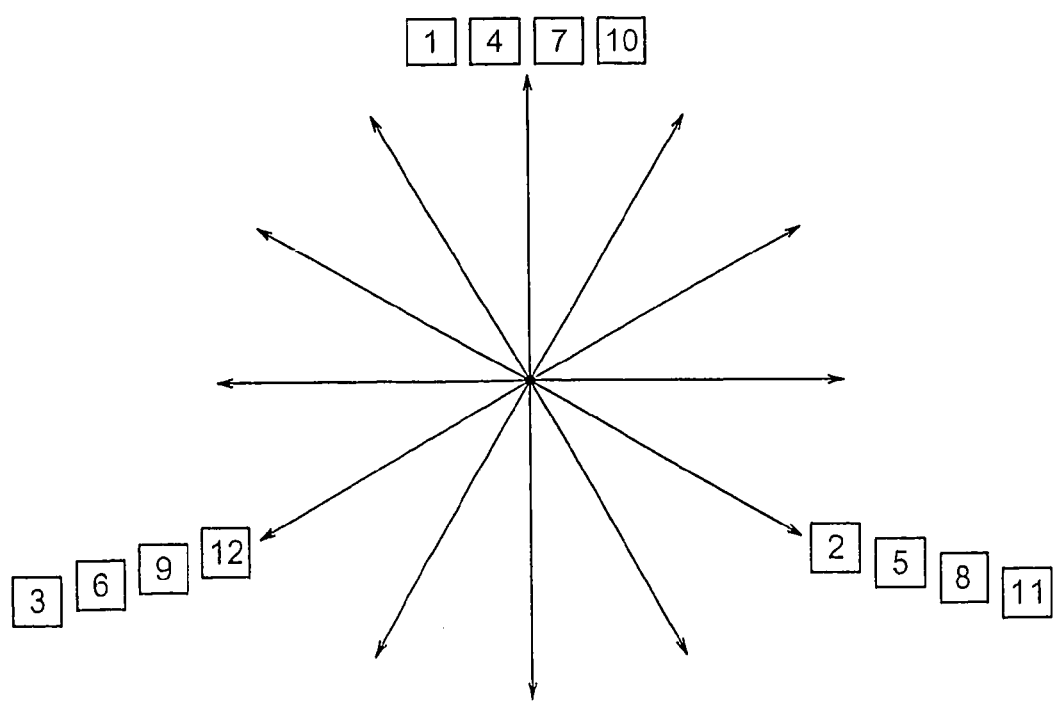

FIG. 62

| TEETH NUMBER | 1 | 2 | 3 | 4 | 5 | 6 | 7 | 8 | 9 | 10 | 11 | 12 |
|---|---|---|---|---|---|---|---|---|---|---|---|---|
| EXCITATION WINDING | 1.0 | 1.0 | -1.0 | -1.0 | 1.0 | 1.0 | -1.0 | -1.0 | 1.0 | 1.0 | -1.0 | -1.0 |
| U-PHASE WINDING | 1.0 | 0.0 | 1.0 | 0.0 | 1.0 | 0.0 | 0.0 | 0.0 | 0.0 | 0.0 | 0.0 | 0.0 |
| V-PHASE WINDING | 1.0 | 0.0 | 0.0 | 0.0 | 0.0 | 0.0 | 0.0 | 0.0 | 1.0 | 0.0 | 1.0 | 0.0 |
| W-PHASE WINDING | 0.0 | 0.0 | 0.0 | 0.0 | 1.0 | 0.0 | 1.0 | 0.0 | 1.0 | 0.0 | 0.0 | 0.0 |

FIG. 63

| TEETH NUMBER | 1 | 2 | 3 | 4 | 5 | 6 | 7 | 8 | 9 | 10 | 11 | 12 |
|---|---|---|---|---|---|---|---|---|---|---|---|---|
| EXCITATION WINDING | 1.0 | 1.0 | -1.0 | -1.0 | 1.0 | 1.0 | -1.0 | -1.0 | 1.0 | 1.0 | -1.0 | -1.0 |
| U-PHASE WINDING | 1.0 | 1.0 | 1.0 | 1.0 | 1.0 | 1.0 | 0.0 | 0.0 | 0.0 | 0.0 | 0.0 | 0.0 |
| V-PHASE WINDING | 1.0 | 1.0 | 0.0 | 0.0 | 0.0 | 0.0 | 0.0 | 0.0 | 1.0 | 1.0 | 1.0 | 1.0 |
| W-PHASE WINDING | 0.0 | 0.0 | 0.0 | 0.0 | 1.0 | 1.0 | 1.0 | 1.0 | 1.0 | 1.0 | 0.0 | 0.0 |

FIG. 64

| TEETH NUMBER | 1 | 2 | 3 | 4 | 5 | 6 | 7 | 8 | 9 | 10 | 11 | 12 |
|---|---|---|---|---|---|---|---|---|---|---|---|---|
| EXCITATION WINDING | 1.0 | 1.0 | -1.0 | -1.0 | 1.0 | 1.0 | -1.0 | -1.0 | 1.0 | 1.0 | -1.0 | -1.0 |
| U-PHASE WINDING | 1.0 | 0.0 | 1.0 | 0.0 | 1.0 | 0.0 | 0.0 | 1.0 | 0.0 | 1.0 | 0.0 | 1.0 |
| V-PHASE WINDING | 1.0 | 0.0 | 0.0 | 1.0 | 0.0 | 1.0 | 0.0 | 1.0 | 1.0 | 0.0 | 1.0 | 0.0 |
| W-PHASE WINDING | 0.0 | 1.0 | 0.0 | 1.0 | 1.0 | 0.0 | 1.0 | 0.0 | 1.0 | 0.0 | 0.0 | 1.0 |

FIG. 65

| TEETH NUMBER | 1 | 2 | 3 | 4 | 5 | 6 | 7 | 8 | 9 | 10 | 11 | 12 |
|---|---|---|---|---|---|---|---|---|---|---|---|---|
| EXCITATION WINDING | 1.0 | 1.0 | -1.0 | -1.0 | 1.0 | 1.0 | -1.0 | -1.0 | 1.0 | 1.0 | -1.0 | 1.0 |
| α-PHASE WINDING | 0.4082 | 0.0000 | 0.8165 | 0.0000 | 0.4082 | 0.0000 | -0.4082 | 0.0000 | -0.8165 | 0.0000 | -0.4082 | 0.0000 |
| β-PHASE WINDING | 0.7071 | 0.0000 | 0.0000 | 0.0000 | -0.7071 | 0.0000 | -0.7071 | 0.0000 | 0.0000 | 0.0000 | 0.7071 | 0.0000 |

FIG. 66

| TEETH NUMBER | 1 | 2 | 3 | 4 | 5 | 6 | 7 | 8 | 9 | 10 | 11 | 12 |
|---|---|---|---|---|---|---|---|---|---|---|---|---|
| EXCITATION WINDING | 1.0 | 1.0 | -1.0 | -1.0 | 1.0 | 1.0 | -1.0 | -1.0 | 1.0 | 1.0 | -1.0 | -1.0 |
| α-PHASE WINDING | 0.4082 | 0.4082 | 0.8165 | 0.8165 | 0.4082 | 0.4082 | -0.4082 | -0.4082 | -0.8165 | -0.8165 | -0.4082 | -0.4082 |
| β-PHASE WINDING | 0.7071 | 0.7071 | 0.0000 | 0.0000 | -0.7071 | -0.7071 | -0.7071 | -0.7071 | 0.0000 | 0.0000 | 0.7071 | 0.7071 |

FIG. 67

| TEETH NUMBER | 1 | 2 | 3 | 4 | 5 | 6 | 7 | 8 | 9 | 10 | 11 | 12 |
|---|---|---|---|---|---|---|---|---|---|---|---|---|
| EXCITATION WINDING | 1.0 | 1.0 | -1.0 | -1.0 | 1.0 | 1.0 | -1.0 | -1.0 | 1.0 | 1.0 | -1.0 | -1.0 |
| α-PHASE WINDING | 0.4082 | -0.4082 | 0.8165 | -0.8165 | 0.4082 | -0.4082 | -0.4082 | 0.4082 | -0.8165 | 0.8165 | -0.4082 | 0.4082 |
| β-PHASE WINDING | 0.7071 | -0.7071 | 0.0000 | 0.0000 | -0.7071 | 0.7071 | -0.7071 | 0.7071 | 0.0000 | 0.0000 | 0.7071 | -0.7071 |

FIG. 68

| TEETH NUMBER | 1 | 2 | 3 | 4 | 5 | 6 | 7 | 8 | 9 | 10 | 11 | 12 |
|---|---|---|---|---|---|---|---|---|---|---|---|---|
| EXCITATION WINDING | 50 | 50 | -50 | -50 | 50 | 50 | -50 | -50 | 50 | 50 | -50 | -50 |
| α-PHASE WINDING | 61 | 0 | 122 | 0 | 61 | 0 | -61 | 0 | -122 | 0 | -61 | 0 |
| β-PHASE WINDING | 106 | 0 | 0 | 0 | -106 | 0 | -106 | 0 | 0 | 0 | 106 | 0 |

FIG. 69

| TEETH NUMBER | 1 | 2 | 3 | 4 | 5 | 6 | 7 | 8 | 9 | 10 | 11 | 12 |
|---|---|---|---|---|---|---|---|---|---|---|---|---|
| EXCITATION WINDING | 50 | 50 | -50 | -50 | 50 | 50 | -50 | -50 | 50 | 50 | -50 | -50 |
| α-PHASE WINDING | 61 | 61 | 122 | 122 | 61 | 61 | -61 | -61 | -122 | -122 | -61 | -61 |
| β-PHASE WINDING | 106 | 106 | 0 | 0 | -106 | -106 | -106 | -106 | 0 | 0 | 106 | 106 |

FIG. 70

| TEETH NUMBER | 1 | 2 | 3 | 4 | 5 | 6 | 7 | 8 | 9 | 10 | 11 | 12 |
|---|---|---|---|---|---|---|---|---|---|---|---|---|
| EXCITATION WINDING | 50 | 50 | -50 | -50 | 50 | 50 | -50 | -50 | 50 | 50 | -50 | -50 |
| α-PHASE WINDING | 61 | -61 | 122 | -122 | 61 | -61 | -61 | 61 | -122 | 122 | -61 | 61 |
| β-PHASE WINDING | 106 | -106 | 0 | 0 | -106 | 106 | -106 | 106 | 0 | 0 | 106 | -106 |

ROTATION ANGLE DETECTION DEVICE THAT CONVERTS M-PHASE WINDINGS INTO TWO-PHASE WINDINGS AND DYNAMO-ELECTRIC MACHINE USING THE SAME

TECHNICAL FIELD

The present invention relates to a rotation angle detection device and a dynamo-electric machine using the same.

BACKGROUND ART

There has been conventionally devised a rotation angle detection device, which utilizes a change in permeance of a gap between a rotor and a stator, as a device which is simple in its structure and inexpensive, and at the same time, can withstand even a high temperature environment as opposed to an optical encoder which is limited in its operating temperature environment and is complicated in its structure and expensive. For example, an example of a rotation angle detection device having excitation windings of two phases and a one-phase output winding is described in JP 62-58445 B. In addition, an example of a rotation angle detection device having an excitation winding of one phase and output windings of two phases is described in JP 49-124508 A. In both the examples, since a rotor is formed to have salient poles, a phase or an amplitude of a voltage induced in an output winding changes depending on an angle of the rotor, and a position of the rotor can be found by reading the change. In addition, a rotation angle detection device having excitation windings of three phases is disclosed in Japanese Patent No. 2624747. Moreover, an example in which a winding is concentrically wound around teeth of a stator and the number of turns is changed in a sine wave shape is disclosed in Japanese Patent No. 3103487 and Japanese Patent No. 3182493.

Examples of the conventional rotation angle detection device are shown in FIGS. 73 and 74. FIG. 73 shows, as a conventional example, an example of the rotation angel detection device in which a shaft multiple angle is 1 and the number of teeth of a stator is four, which is the same as the rotation angle detection device disclosed in JP 49-124508 A. On the other hand, FIG. 74 shows an example of the rotation angle detection device in which a shaft multiple angle is 4 and the number of teeth of a stator is sixteen. In those figures, reference numeral 100 denotes a stator; 101, a rotor; 102, four teeth provided in the stator 100; and 103, a winding wound around the teeth 102. In a system of FIG. 73, as the shaft multiple angle increases, the number of teeth also increases in proportion thereto. For example, in the case in which the shaft multiple angle is changed to 4, the structure changes to the one as shown in FIG. 74, the number of teeth increases to as many as sixteen, and winding workability deteriorates. Thus, it can be said that this is a structure not suitable for mass production.

The above-mentioned conventional examples have the following problems. If the winding structures as disclosed in JP 62-58445 B and JP 49-124508 A are adopted, there is a problem in that, in the case in which the shaft multiple angle increases, the number of teeth of the stator also increases in proportion thereto as described above, and a winding property and a machining property deteriorate.

In both of JP 62-58445 B and JP 49-124508 A, the shaft multiple angle island the number of teeth of the stator is four. For example, in the case in which the shaft multiple angle is changed to 2, the number of teeth increases to eight, in the case in which the shaft multiple angle is changed to 4, the number of teeth increases to sixteen, and in the case in which the shaft multiple angle is change to 8, the number of teeth increases to as many as thirty-two. Although a rotation angle detection device with a large shaft multiple angle may be required in a multipolar motor, if the shaft multiple angle is large in such conventional examples, the rotation angle detection device has a structure which is unrealistic in terms of mass productivity.

In the structure as disclosed in Japanese Patent No. 2624747, windings are one phase for output and three phases for excitation. That is, the number of phase is large. Thus, there is a problem of productivity in that winding takes time and a problem in that a power supply for the excitation windings becomes expensive.

In the examples of Japanese Patent No. 3103487 and Japanese Patent No. 3182493, since a winding is wound concentrically around the teeth of the stator, automatic winding by a machine is enabled. However, since the number of turns is changed in a sine wave shape, there are teeth to which only a small number of turns are applied. A nozzle of a winding machine for automatic winding has to be moved to the teeth to which only a small number of turns are applied. Thus, since time is taken for positioning of the nozzle, there is a problem in that efficiency of winding work is low.

The present invention has been made in order to solve such problems, and therefore it is an object of the present invention to obtain a rotation angle detection device with a simple manufacturing process and a dynamo-electric machine using the same.

DISCLOSURE OF THE INVENTION

A rotation angle detection device according to the present invention includes: a stator provided with a one-phase excitation winding and two-phase output windings; and a rotor having salient poles, and in the rotation angle detection device, the two-phase output windings are wound around a plurality of teeth of the stator, and respective numbers of turns of the two-phase output windings are obtained by using m-phase windings (m is an integer of 3 or more) defined in advance to convert the numbers of turns of the m-phase windings into those of two-phase windings.

In this way, according to the present invention, the respective numbers of turns of the two-phase output windings are obtained by using the m-phase windings (m is an integer of 3 or more) defined in advance to convert the number of turns of the m-phase windings into those of two-phase windings. Thus, the number of phases decreases from m to two, a structure is simplified, and a manufacturing process is facilitated.

BRIEF DESCRIPTION OF THE DRAWINGS

FIG. 5 is an explanatory view showing, in a table format, an example of a five-phase windings in the rotation angle detection device in accordance with the first embodiment of the present invention;

FIG. 6 is an explanatory view showing, in a table format, an example of windings after five-phase-to-two-phase conversion in the rotation angle detection device in accordance with the first embodiment of the present invention;

FIG. 7 is an explanatory view showing, in a table format, an example of specific windings (in the case in which decimals are allowed for the number of turns) in the rotation angle detection device in accordance with the first embodiment of the present invention;

FIG. 8 is an explanatory view showing, in a table format, an example of specific windings (in the case in which the number of turns is an integer) in the rotation angle detection device in accordance with the first embodiment of the present invention;

FIG. 14 is a vector diagram with respect to a magnetic flux of a spatial third order in the rotation angle detection device in accordance with the second embodiment of the present invention;

FIG. 15 is an explanatory view showing, in a table format, an example of a three-phase windings in the rotation angle detection device in accordance with the second embodiment of the present invention;

FIG. 16 is an explanatory view showing, in a table format, an example of windings after three-phase-to-two-phase conversion in the rotation angle detection device in accordance with the second embodiment of the present invention;

FIG. 17 is an explanatory view showing, in a table format, an example of specific windings (in the case in which decimals are allowed for the number of turns) in the rotation angle detection device in accordance with the second embodiment of the present invention;

FIG. 18 is an explanatory view showing, in a table format, an example of specific windings (in the case in which the number of turns is an integer) in the rotation angle detection device in accordance with the second embodiment of the present invention;

FIG. 22 is an explanatory view showing, in a table format, an example with a shaft multiple angle of 2 and the number of slots of nine in the rotation angle detection device in accordance with the second embodiment of the present invention (FIG. 21);

FIG. 23 is an explanatory view showing, in a table format, an example of windings after three-phase-to-two-phase conversion in the rotation angle detection device in accordance with the second embodiment of the present invention (FIG. 21);

FIG. 24 is an explanatory view showing, in a table format, an example of specific windings (in the case in which decimals are allowed for the number of turns) in the rotation angle detection device in accordance with the second embodiment of the present invention (FIG. 21);

FIG. 25 is an explanatory view showing, in a table format, an example of specific windings (in the case in which the number of turns is an integer) in the rotation angle detection device in accordance with the second embodiment of the present invention (FIG. 21);

FIG. 29 is an explanatory view showing, in a table format, an example of three-phase windings in the rotation angle detection device in accordance with the third embodiment of the present invention;

FIG. 30 is an explanatory view showing, in a table format, an example of windings after three-phase-to-two-phase conversion in the rotation angle detection device in accordance with the third embodiment of the present invention;

FIG. 31 is an explanatory view showing, in a table format, an example of specific windings in the rotation angle detection device in accordance with the third embodiment of the present invention;

FIG. 34 is an explanatory view showing, in a table format, an example of three-phase windings in the rotation angle detection device in accordance with the third embodiment of the present invention;

FIG. 35 is an explanatory view showing, in a table format, an example of windings after three-phase-to-two-phase conversion in the rotation angle detection device in accordance with the third embodiment of the present invention;

FIG. 36 is an explanatory view showing, in a table format, an example of specific windings in the rotation angle detection device in accordance with the third embodiment of the present invention;

FIG. 39 is an explanatory view showing, in a table format, an example of three-phase windings in the rotation angle detection device in accordance with the fourth embodiment of the present invention;

FIG. 40 is an explanatory view showing, in a table format, an example of windings after three-phase-to-two-phase conversion in the rotation angle detection device in accordance with the fourth embodiment of the present invention;

FIG. 41 is an explanatory view showing, in a table format, an example of specific windings in the rotation angle detection device in accordance with the fourth embodiment of the present invention;

FIG. 44 is an explanatory view showing, in a table format, an example of three-phase windings in the rotation angle detection device in accordance with the fifth embodiment of the present invention;

FIG. 45 is an explanatory view showing, in a table format, an example of windings after three-phase-to-two-phase conversion in the rotation angle detection device in accordance with the fifth embodiment of the present invention;

FIG. 46 is an explanatory view showing, in a table format, an example of specific windings in the rotation angle detection device in accordance with the fifth embodiment of the present invention;

FIG. 49 is an explanatory view showing, in a table format, an example of three-phase windings in the rotation angle detection device in accordance with the fifth embodiment of the present invention (FIG. 48);

FIG. 50 is an explanatory view showing, in a table format, an example of windings after three-phase-to-two-phase conversion in the rotation angle detection device in accordance with the fifth embodiment of the present invention (FIG. 48);

FIG. 51 is an explanatory view showing, in a table format, an example of specific windings in the rotation angle detection device in accordance with the fifth embodiment of the present invention (FIG. 48);

FIG. 55 is an explanatory view showing, in a table format, an example of three-phase windings (an example of windings which do not pick up a magnetic flux of the same order as a shaft multiple angle) in the rotation angle detection device in accordance with the sixth embodiment of the present invention;

FIG. 56 is an explanatory view showing, in a table format, an example of windings after three-phase-to-two-phase conversion (an example of windings which do not pick up a magnetic flux of the same order as a shaft multiple angle) in the rotation angle detection device in accordance with the sixth embodiment of the present invention;

FIG. 57 is an explanatory view showing, in a table format, an example of specific windings (an example of windings which do not pick up a magnetic flux of the same order as a shaft multiple angle) in the rotation angle detection device in accordance with the sixth embodiment of the present invention;

FIG. 60 is a vector diagram with respect to a magnetic flux of a spatial second order in the rotation angle detection device in accordance with the eighth embodiment of the present invention;

FIG. 61 is a vector diagram with respect to a magnetic flux of a spatial fourth order in the rotation angle detection device in accordance with the eighth embodiment of the present invention;

FIG. 62 is an explanatory view showing, in a table format, three-phase windings in the rotation angle detection device in accordance with the eighth embodiment of the present invention (No. 1);

FIG. 63 is an explanatory view showing, in a table format, three-phase windings in the rotation angle detection device in accordance with the eighth embodiment of the present invention (No. 2);

FIG. 64 is an explanatory view showing, in a table format, three-phase windings in the rotation angle detection device in accordance with the eighth embodiment of the present invention (No. 3);

FIG. 65 is an explanatory view showing, in a table format, an example of windings after three-phase-to-two-phase conversion in the rotation angle detection device in accordance with the eighth embodiment of the present invention (No. 1);

FIG. 66 is an explanatory view showing, in a table format, an example of windings after three-phase-to-two-phase conversion in the rotation angle detection device in accordance with the eighth embodiment of the present invention (No. 2);

FIG. 67 is an explanatory view showing, in a table format, an example of windings after three-phase-to-two-phase conversion in the rotation angle detection device in accordance with the eighth embodiment of the present invention (No. 3);

FIG. 68 is an explanatory view showing, in a table format, an example of specific windings in the rotation angle detection device in accordance with the eighth embodiment of the present invention (No. 1);

FIG. 69 is an explanatory view showing, in a table format, an example of specific windings in the rotation angle detection device in accordance with the eighth embodiment of the present invention (No. 2);

FIG. 70 is an explanatory view showing, in a table format, an example of specific windings in the rotation angle detection device in accordance with the eighth embodiment of the present invention (No. 3);

BEST MODE FOR CARRYING OUT THE INVENTION

First Embodiment

Figure 73:
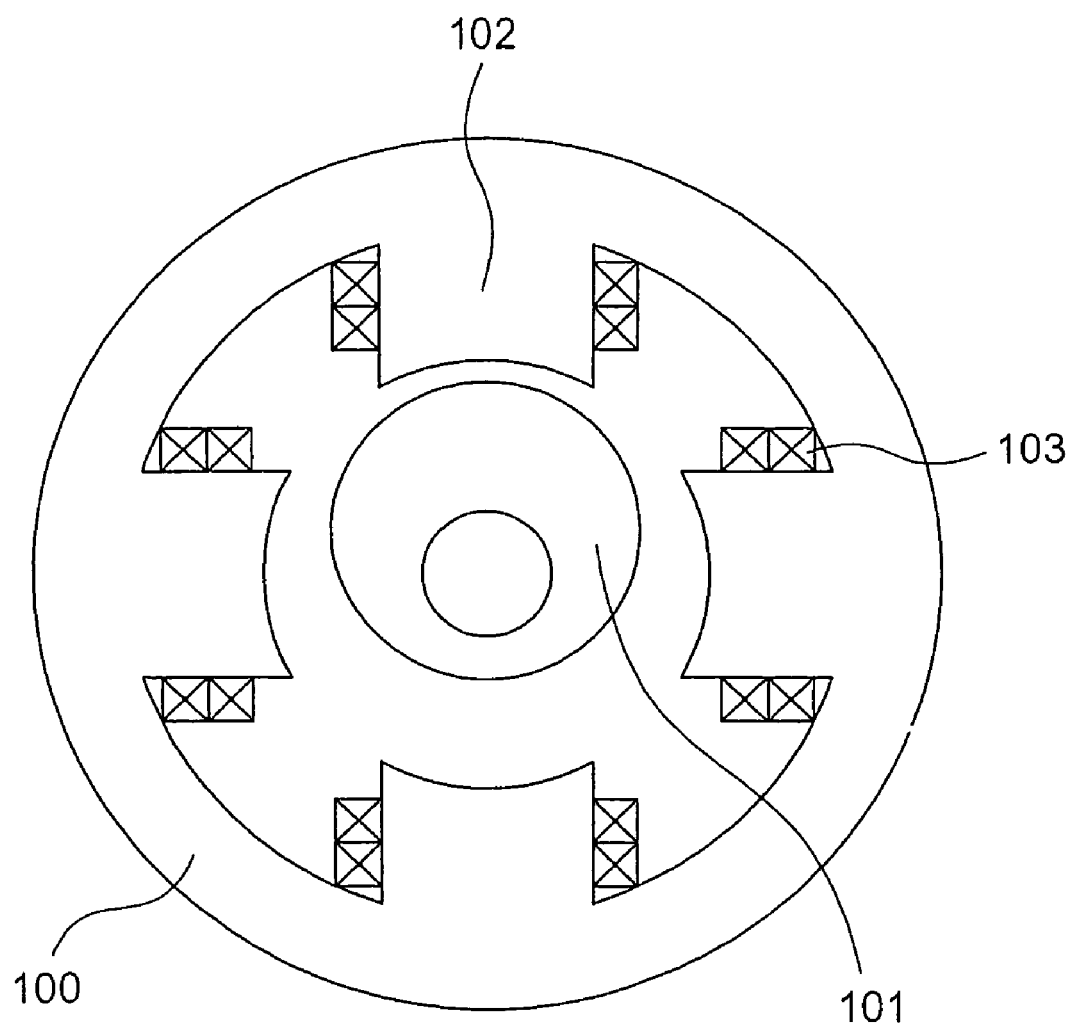
FIG. 73 is a diagram showing an example of a structure of a conventional rotation angle detection device.
Figure 74:
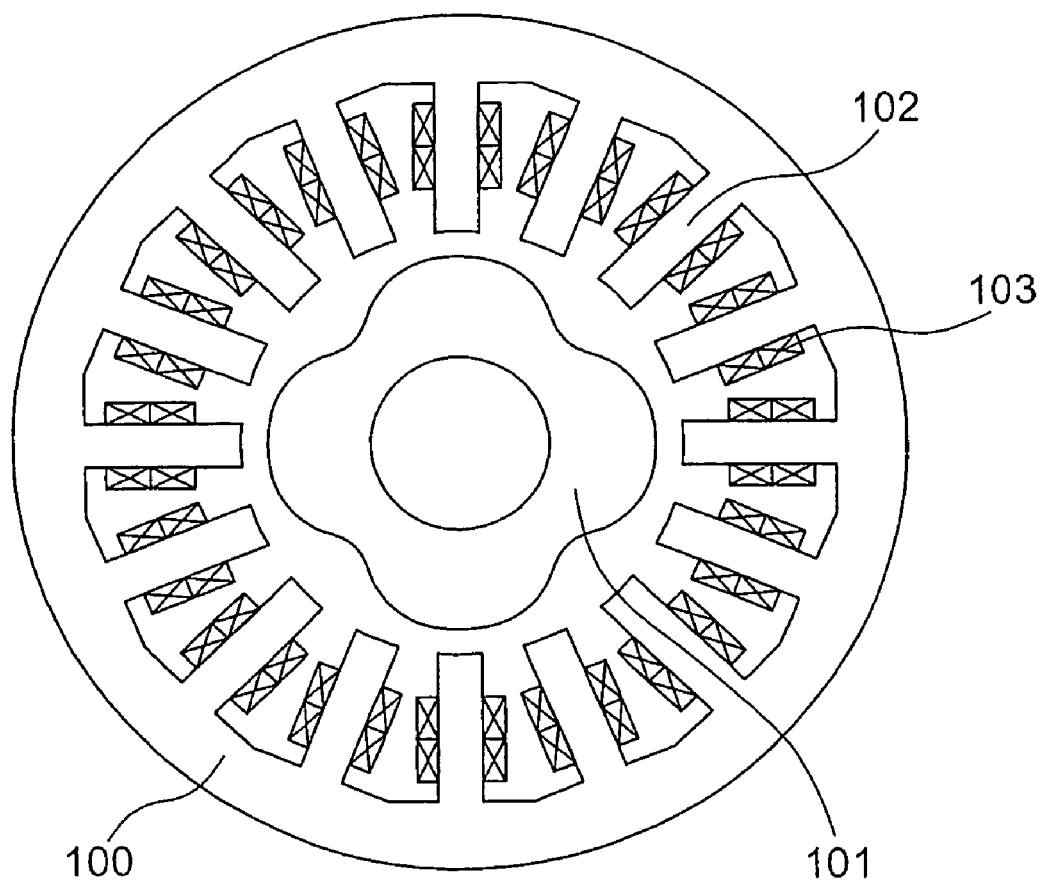
FIG. 74 is a diagram showing another example of the structure of the conventional rotation angle detection device.

Here, as an embodiment, a rotation angel detection device with a shaft multiple angle of 4 (the number of teeth is ten, five-phase-to-two-phase conversion) will be described. In the conventional examples shown in FIGS. 73 and 74, as described above, as a shaft multiple angle increases, the number of teeth also increases in proportion thereto. For example, as in the example of FIG. 74, in the case in which the shaft multiple angle is changed to 4, the number of teeth increases to as many as sixteen, and winding workability falls. Thus, this is a structure not suitable for mass production.

However, according to the present invention, even if the shaft multiple angle increases, a rotation angle detection device can be constituted by reducing the number of teeth compared with the above-mentioned conventional examples. The constitution will be hereinafter described.

Figure 1:
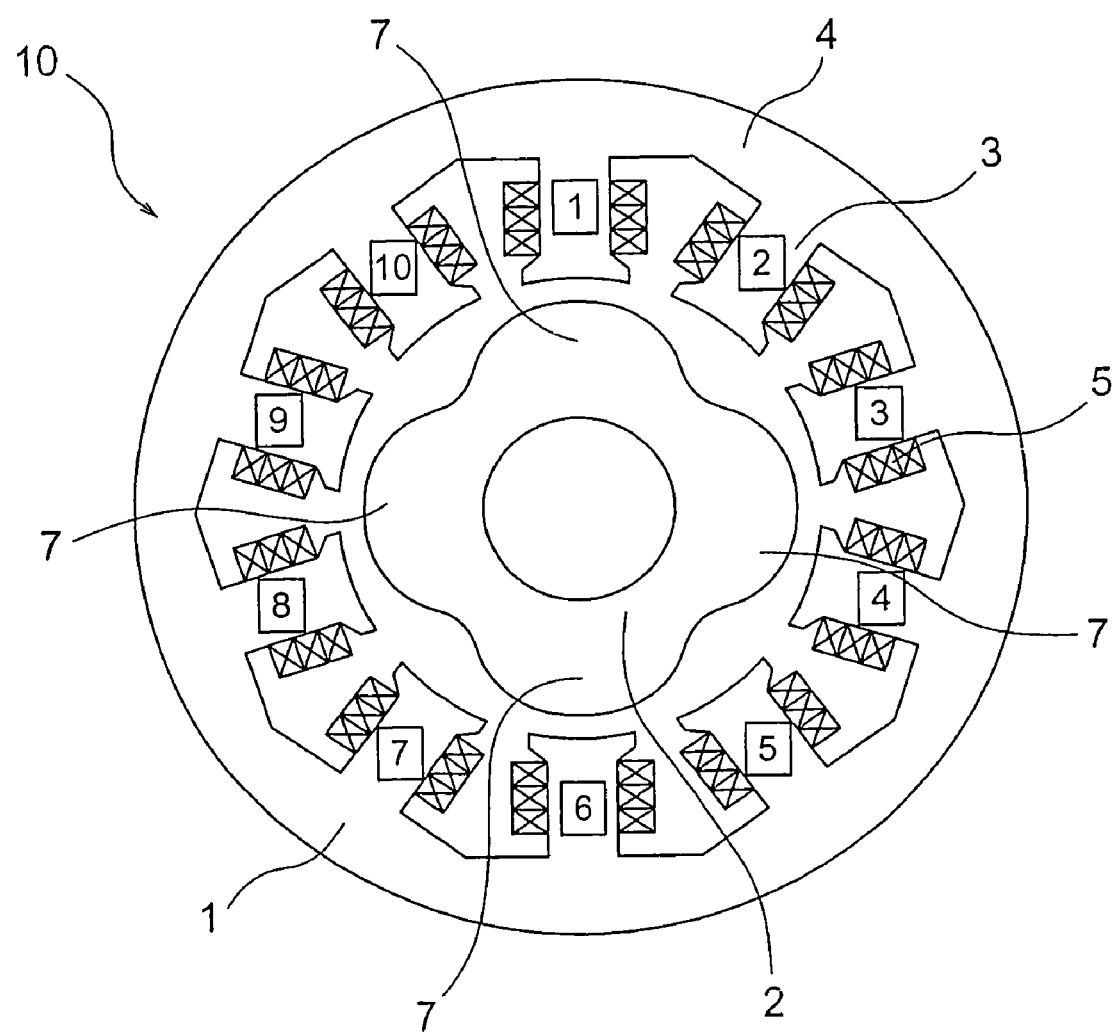
FIG. 1 is a diagram showing a structure of a rotation angle detection device in accordance with a first embodiment of the present invention.

FIG. 1 shows a rotation angle detection device in accordance with a first embodiment of the present invention in which a shaft multiple angle is 4 and the number of teeth of a stator is ten. In FIG. 1, reference numeral 1 denotes a stator; 2, a rotor; 3, ten teeth provided in the stator 1; 4, a core of the stator 1; 5, a winding wound around the teeth 3; 6, a core of the rotor 2; 7, four salient poles provided in the core 6; and 10, a rotation angle detection device. As shown in FIG. 1, the stator 1 is constituted by the core 4 having ten teeth 3, the one-phase excitation winding 5, and output windings of two phases (not shown). In addition, the rotor 2 is constituted by the core 6 having four salient poles 7 so as to function as the rotation angle detection device 10 with the shaft multiple angle of 4, and is made rotatable with respect to the stator 1.

Next, it will be explained how to constitute the one-phase excitation winding 5 and the output windings of two phases. The excitation winding 5 is concentrically wound around the respective teeth 3 with the teeth numbers 1 to 10. In addition, the excitation winding 5 is wound such that polarities thereof are opposite in the teeth 3 adjacent to each other. In other words, a winding with which 10 magnetic poles can be constituted is provided. In this case, it will be considered how the output windings should be wound. In order to function as a rotation angle detection device, the output windings are required to pick up a magnetic flux of a spatial order equal to:

(number of pole pairs for excitation)±(shaft multiple angle) among magnetic fluxes formed in a gap. Here, since the number of pole pairs for excitation is 5 and the shaft multiple angle is 4:

$$5 \pm 4 = 1, 9.$$

Thus, the output windings are required to pick up a magnetic flux of the spatial first order or ninth order (however, the spatial first order means an order with a machine angle 360 degrees as one cycle). In addition, the output windings should not pick up a magnetic flux of the spatial order of the number of pole pairs for excitation or an integer times thereof. Thus, conditions necessary for the output windings of two phases to function as the rotation angle detection device are summarized as follows:

(1) pick up a magnetic flux of the spatial first order or the spatial ninth order; and (2) do not pick up a magnetic flux of the spatial fifth order or an integer times thereof.

In order to satisfy the conditions, first, considering the output winding of five phases imaginarily, five-phase windings are converted into two phases to have two-phase windings of a sin output and a cos output (hereinafter referred to as α phase and β phase windings).

Figure 2:
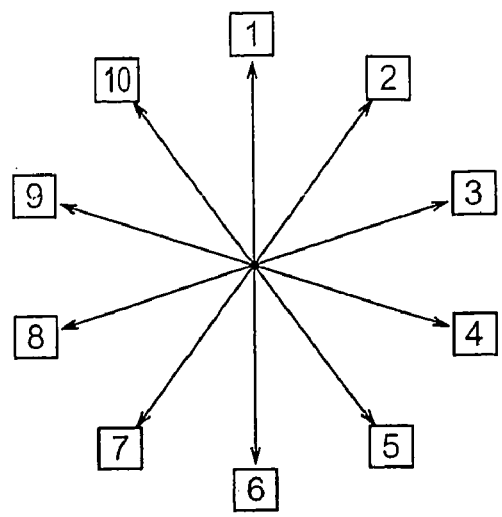
FIG. 2 is a vector diagram with respect to a magnetic flux of a spatial first order in the rotation angle detection device in accordance with the first embodiment of the present invention.
Figure 3:
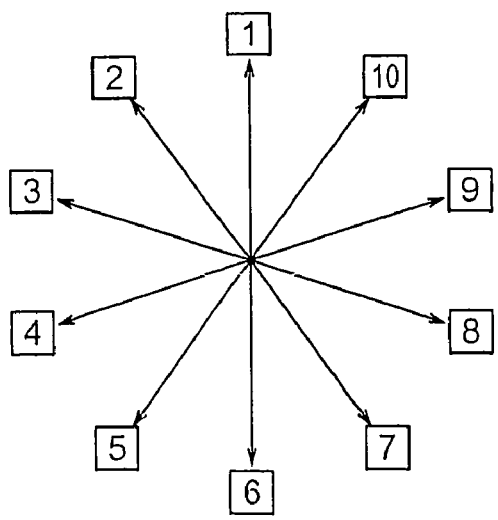
FIG. 3 is a vector diagram with respect to a magnetic flux of a spatial ninth order in the rotation angle detection device in accordance with the first embodiment of the present invention.

First, five-phase windings satisfying the condition (1) will be considered. Here, this will be considered using vector diagrams. FIGS. 2 and 3 show in which phase the winding with the magnetic flux of the spatial first order or the ninth order wound around the respective teeth links. Each vector number represents a teeth number, and indicates a phase of a magnetic flux in which a winding wound around the respective teeth numbers links. It is assumed that the phase advances counterclockwise. From the vector diagrams, if the winding is applied to the teeth numbers 1, 5, and 7 and a polarity of the teeth numbers 5 and 7 is set to a polarity opposite to that of the teeth 1, both magnetic fluxes of the spatial first order and the spatial ninth order can be picked up. If windings deviating from this winding by an electrical angle of 72 degrees are constituted for the remaining four phases, the magnetic fluxes of the spatial first order and the spatial ninth order for functioning as the rotation angle detection device are picked up, and the windings of five phases deviating by the electrical angle of 72 degrees, respectively, can be constituted (provided that the electrical angle is assumed to be an angle found by multiplying a machine angle by a shaft multiple angle). In other words, winding specifications as shown in a table of FIG. 5 are obtained. Here, the number of turns is represented by ±1.0 in order to standardize the number, and a difference of signs represents a difference of polarities. In addition, parts of 0.0 indicate the parts which a winding is not applied to.

The output windings of five phases satisfying the condition (1) are formed as described above. If the windings remain in five phases, the windings do not satisfy the condition (2) and, in addition, even if the output windings function as the rotation angle detection device, a processing circuit becomes complicated and expensive. Thus, in order to convert the five-phase windings into two-phase winding (α phase, β phase), five-phase-to-two-phase conversion as indicated by the following expression (1) is defined.

$$\begin{pmatrix} N_\alpha \\ N_\beta \end{pmatrix} = k \begin{pmatrix} \cos\gamma & \cos\left(\gamma+\frac{2\pi}{5}\right) & \cos\left(\gamma+\frac{4\pi}{5}\right) \\ \sin\gamma & \sin\left(\gamma+\frac{2\pi}{5}\right) & \sin\left(\gamma+\frac{4\pi}{5}\right) \end{pmatrix}$$

$$\begin{pmatrix} \cos\left(\gamma+\frac{6\pi}{5}\right) & \cos\left(\gamma+\frac{8\pi}{5}\right) \\ \sin\left(\gamma+\frac{6\pi}{5}\right) & \sin\left(\gamma+\frac{8\pi}{5}\right) \end{pmatrix} \begin{pmatrix} N_1 \\ N_2 \\ N_3 \\ N_4 \\ N_5 \end{pmatrix} \quad (1)$$

Here, k represents a constant, $N_\alpha$ and $N_\beta$ represent the numbers of turns of the α phase and β phase output windings, respectively and Ni (i=1, . . . , 5) represents the number of turns of the i-th output winding. In addition, γ represents an arbitrary angle.

Figure 4:
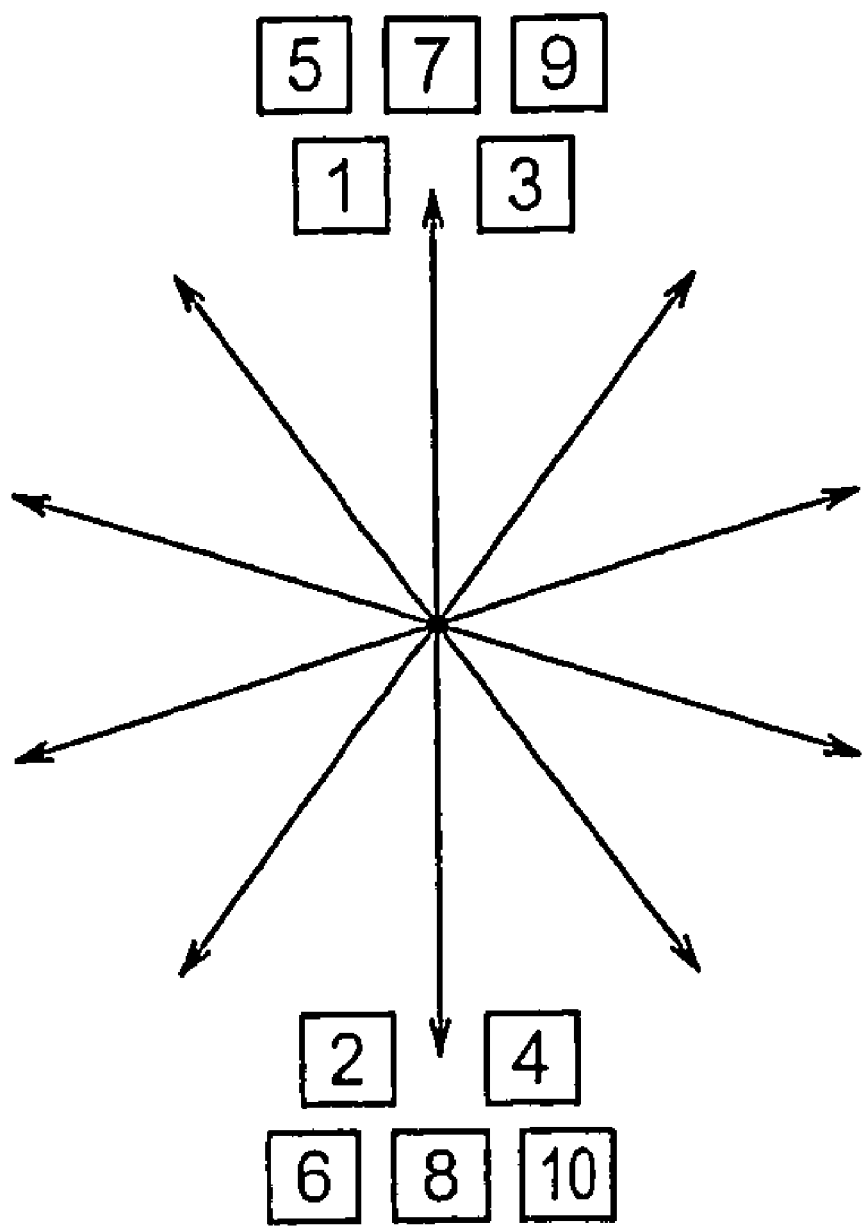
FIG. 4 is a vector diagram with respect to a magnetic flux of a spatial fifth order in the rotation angle detection device in accordance with the first embodiment of the present invention.

If the numbers of turns of the respective teeth are determined by five-phase-to-two-phase conversion represented by expression (1), magnetic fluxes linking with the windings are also subjected to the five-phase-to-two-phase conversion. In addition, the condition (2) is satisfied by this five-phase-to-two-phase conversion. This is because, according to a vector diagram (FIG. 4) for a magnetic flux of the spatial fifth order, it is evident that the phase is the same in the windings of five phases and, in this case, the magnetic flux is cancelled by means of the condition (1). Thus, it is observed that the condition (2) is satisfied by the five-phase-to-two-phase conversion, and the output windings of two phases has winding specifications for functioning as the rotation angel detection device. Then, an example in which γ and k are specifically assumed to be 0 and 1, respectively, in expression (1) and FIG. 5 is subjected to the five-phase-to-two-phase conversion is shown in FIG. 6. However, a number is rounded off to the fourth decimal place. The realistic numbers of turns which are decided specifically on the basis of FIG. 6 are shown in FIGS. 7 and 8. Values obtained by multiplying the numbers of turns in FIG. 6 by 50 and 100 are indicated for excitation windings and output windings, respectively. In addition, FIG. 7 shows a case in which decimals are allowed for the number of turns (ideal case). FIG. 8 shows the case in which decimals are rounded off.

Figure 9:
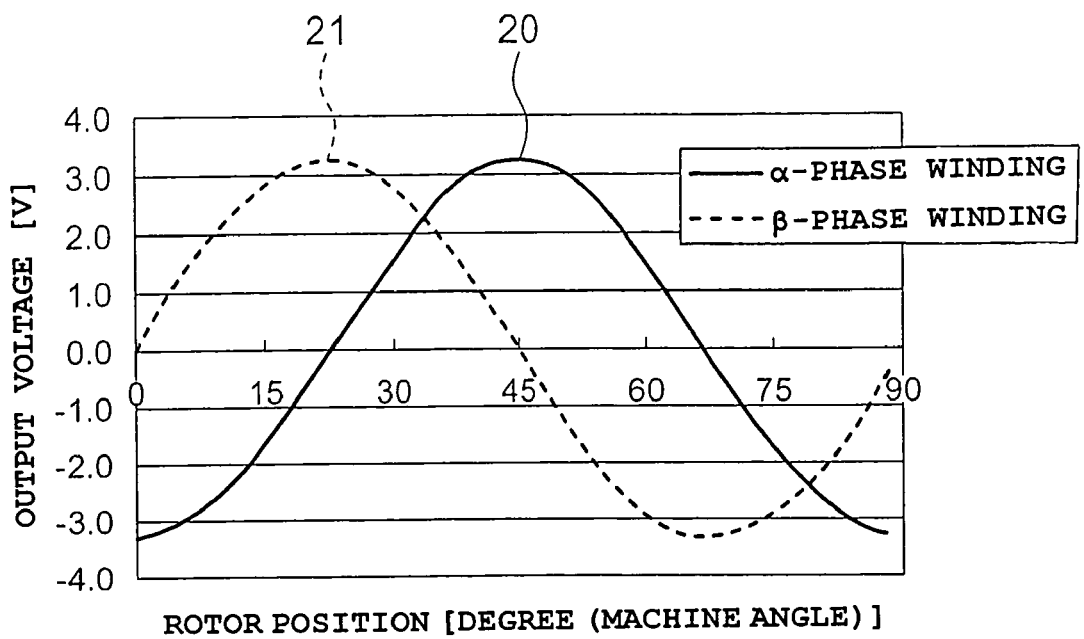
FIG. 9 is an explanatory view showing, in a graph format, output voltage waveforms of two phases (in the case of winding specifications of FIG. 7) in the rotation angle detection device in accordance with the first embodiment of the present invention.
Figure 10:
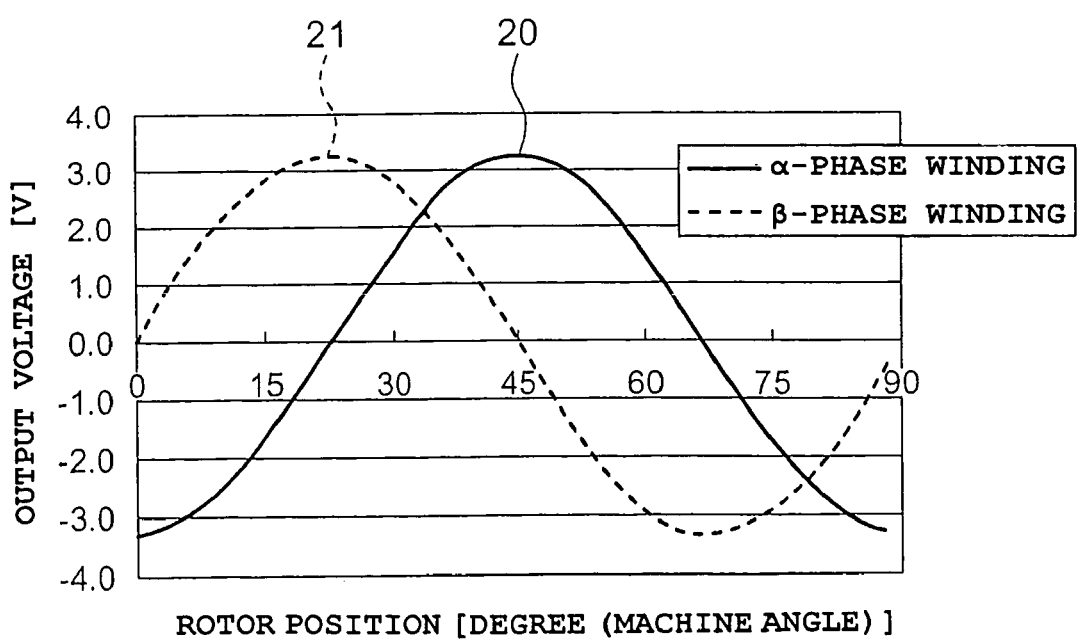
FIG. 10 is an explanatory view showing, in a graph format, output voltage waveforms of two phases (in the case of winding specifications of FIG. 8) in the rotation angle detection device in accordance with the first embodiment of the present invention.

Graphs of FIGS. 9 and 10 show how a voltage appearing in the output windings of two phases is changed by a rotor position when the winding specifications are set as shown in FIGS. 7 and 8 and excitation windings are excited by an AC current. In these figures, reference numeral 20 denotes an α phase winding and 21 denotes a β phase winding. In addition, the horizontal axis indicates a position of a rotor with a machine angle, and the vertical axis indicates a voltage generated in the output windings. Note that a minus sign of a voltage indicates that a phase is reversed with respect to an electric current of the excitation windings. In both cases, since voltages deviate by an electric angle of 90 degrees from each other in a waveform of a sine wave shape, it was confirmed that the output windings operate as the rotation angle detection device.

As described above, the output windings of two phases were obtained by imaginarily defining the windings of five phases, and then subjecting the output windings to the five-phase-to-two-phase conversion. Accordingly, it was confirmed that the output windings operate as the rotation angle detection device. With such a constitution, since the number of phases decreases compared with a rotation angle detection device in which excitation is constituted by three phases, there is obtained an effect in that a structure is simplified and a manufacturing process is facilitated. Moreover, in the conventional examples, the number of teeth of a stator is 16 in the case in which a shaft multiple angle is 4, whereas, according to the present invention, it is sufficient that the number of teeth is 10. In other words, since the rotation angle detection device can be constituted with the smaller number of teeth than the conventional examples even if the shaft multiple angle increases, there is also an effect in that the rotation angle detection device has satisfactory winding property and machining property and is excellent in mass productivity. Moreover, in the conventional examples, the number of turns may be changed in a sine wave shape. In this case, there are teeth to which only a small number of turns are applied. Since positioning of a nozzle of a winding machine for automatic winding, which takes time, is required to be performed for the teeth, there is a problem in that efficiency of winding work falls. In the present invention, as it is evident from FIGS. 6, 7, and 8, there are a plurality of teeth to which output windings may not be applied, thus having an effect in that efficiency of winding work can be improved.

Although the five-phase-to-two-phase conversion is described above, output windings operating as the rotation angle detection device can also be obtained by generally converting m phases (m is an integer of 3 or more) into two phases. In that case, it is sufficient to define m-phase-to-two-phase conversion as described below.

$$N_{\alpha i} = k\sum_{n=1}^{m} N_{ni}\cos\left(\gamma + \frac{2(n-1)}{m}\pi\right) \quad (2)$$

$$N_{\beta i} = k\sum_{n=1}^{m} N_{ni}\sin\left(\gamma + \frac{2(n-1)}{m}\pi\right) \quad (3)$$

Here, in expressions (2) and (3), γ represents an arbitrary constant, k represents an arbitrary constant excluding zero, a subscript i represents a number of a tooth, α and β represent two-phase windings after conversion, and n represents nth phase before conversion. In other words, $N_{\alpha i}$ and $N_{\beta i}$ represent the number of turns of the α-phase and β-phase windings in the i-th tooth, respectively, and $N_{ni}$ represents the number of turns of nth phase winding of the i-th tooth. It is needless to mention that the same effects can be obtained from the windings constituted by converting the windings of m phases into two phases in this way. In addition, the numbers of turns of the respective teeth of the rotation angle detection device in the present invention are not required to be strictly identical with the numbers of turns decided by the m-phase-to-two-phase conversion. For example, as shown in FIGS. 9 and 10, the output windings function as the rotation angle detection device without any problem regardless of whether decimals are rounded off or not as already described. Moreover, for example, even if the number of turns deviates by about 10% from the number of turns decided by the m-phase-to-two-phase conversion, a sine wave in FIG. 10 simply deviates by about 10%. It is needless to mention that the above-mentioned effects are not spoiled, and the output windings operate as the rotation angle detection device.

Second Embodiment

In this embodiment, an example of constituting windings using three-phase-to-two-phase conversion will be described, while in the first embodiment, the specific examples of the five-phase-to-two-phase conversion and the method of converting the general windings of m phases into two phases are described.

Figure 11:
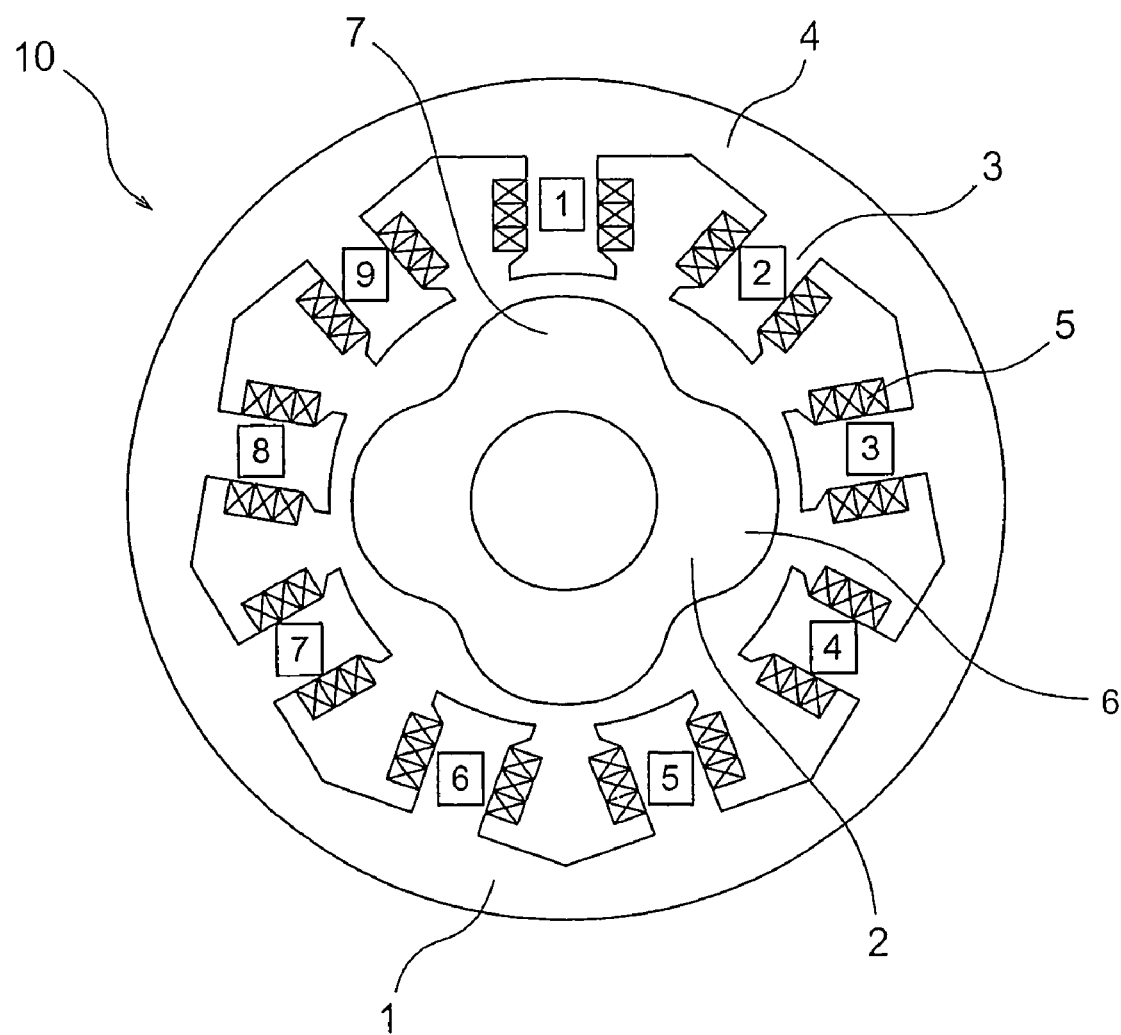
FIG. 11 is a diagram showing a structure of a rotation angle detection device in accordance with a second embodiment of the present invention.

FIG. 11 shows a rotation angle detection device in which a shaft multiple angle is 4 and the number of teeth is 9. In this embodiment, the number of teeth is set to 3n (n is a natural number; here, n=3). In FIG. 11, reference numeral 1 denotes a stator; 2, a rotor; 3, nine teeth provided in the stator 1; 4, a core of the stator 1; 5, a winding wound around the teeth 3; 6, a core of the rotor 2; 7, four salient poles provided in the core 6; and 10, a rotation angle detection device. The stator 1 is constituted by the core 4 having nine teeth 3, the one-phase excitation winding 5, and output windings of two phases (not shown). In addition, the rotor 2 is constituted by the core 6 having four salient poles 7 so as to function as the rotation angle detection device 10 with the shaft multiple angle of 4, and is made rotatable with respect to the stator 1.

Next, it will be explained how to constitute the one-phase excitation winding 5 and the output windings of two phases. The excitation winding 5 is concentrically wound around the respective teeth 3 with the teeth numbers 1 to 9. The excitation winding 5 is wound such that a winding with which 6 magnetic poles can be constituted. In this case, it will be considered how the output windings should be wound. In order to function as a rotation angle detection device, the output windings are required to pick up a magnetic flux of a spatial order equal to:

(number of pole pairs for excitation)±(shaft multiple angle) among magnetic fluxes formed in a gap. Here, since the number of pole pairs for excitation is 3 and the shaft multiple angle is 4:

4±3=1, 7

Thus, the output windings are required to pick up a magnetic flux of the spatial first order or seventh order (however, the spatial first order means an order with a machine angle 360 degrees as one cycle). In addition, the output windings should not pick up a magnetic flux of the spatial order of the number of pole pairs for excitation or an integer times thereof. Thus, conditions necessary for the output windings of two phases to function as the rotation angle detection device are summarized as follows:

(1) pick up a magnetic flux of the spatial first order or the spatial seventh order; and
(2) do not pick up a magnetic flux of the spatial third order or an integer times thereof.

In order to satisfy the conditions, first, considering the output winding of three phases (U phase, V phase, and W phase) imaginarily, three-phase windings are converted into two phases to have two-phase windings of a sin output and a cos output (hereinafter referred to as α phase and β phase windings).

Figure 12:
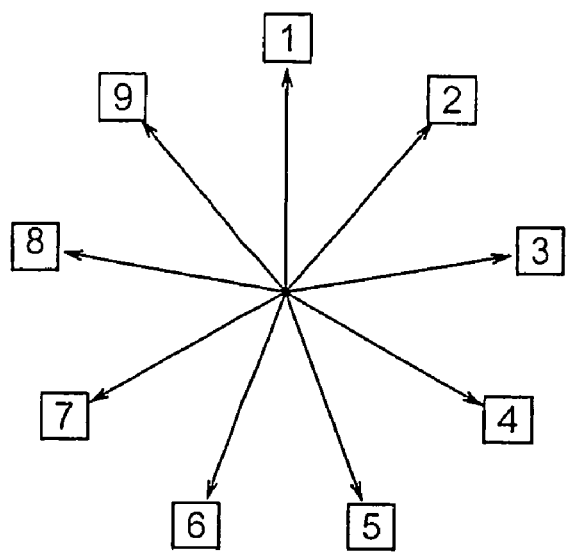
FIG. 12 is a vector diagram with respect to a magnetic flux of a spatial first order in the rotation angle detection device in accordance with the second embodiment of the present invention.
Figure 13:
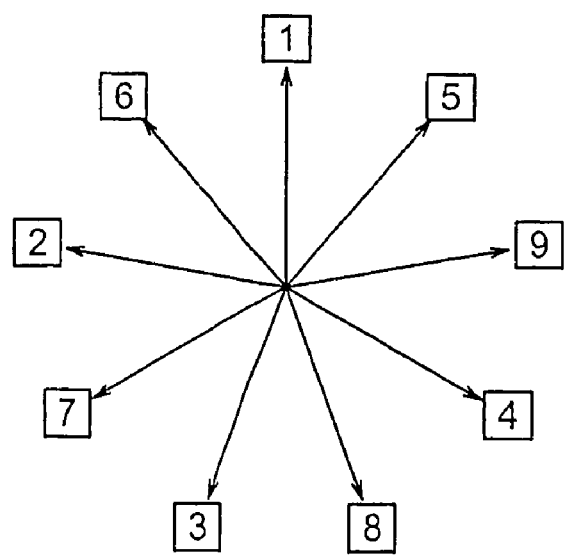
FIG. 13 is a vector diagram with respect to a magnetic flux of a spatial seventh order in the rotation angle detection device in accordance with the second embodiment of the present invention.

First, three-phase windings satisfying the condition (1) will be considered. Here, this will be considered using vector diagrams. FIGS. 12 and 13 show in which phase the winding with the magnetic flux of the spatial first order or the seventh order wound around the respective teeth links. Each vector number represents a teeth number, and indicates a phase of a magnetic flux in which a winding wound around the respective teeth numbers links. It is assumed that the phase advances counterclockwise. From the vector diagrams, if the winding is applied to the teeth numbers 1, 5, and 6 and a polarity of the teeth numbers 5 and 6 is set to a polarity opposite to that of the teeth 1, a magnetic flux of the spatial first order can be picked up. If windings deviating from this winding by an electrical angle of 120 degrees are constituted for the remaining three phases, the magnetic fluxes of the spatial first order and the spatial seventh order for functioning as the rotation angle detection device are picked up, and the windings of three phases deviating by the electrical angle of 120 degrees, respectively, can be constituted (provided that the electrical angle is assumed to be an angle found by multiplying a machine angle by a shaft multiple angle). In other words, winding specifications as shown in a table of FIG. 15 are obtained. Here, the number of turns is represented by ±1.0 in order to standardize the number, and a difference of signs represents a difference of polarities. In addition, parts of 0.0 indicate the parts which a winding is not applied to.

The output windings of three phases satisfying the condition (1) are formed as described above. If the windings remain in three phases, the windings do not satisfy the condition (2) and, in addition, even if the output windings function as the rotation angle detection device, a processing circuit becomes complicated and expensive. Thus, in order to convert the three-phase windings into two-phase winding (α phase, β phase), three-phase-to-two-phase conversion as indicated by the following expression (4) is defined.

$$\begin{pmatrix} N_\alpha \\ N_\beta \end{pmatrix} = k \begin{pmatrix} \cos\gamma & \cos\left(\gamma + \frac{2\pi}{3}\right) & \cos\left(\gamma - \frac{2\pi}{3}\right) \\ \sin\gamma & \sin\left(\gamma + \frac{2\pi}{3}\right) & \sin\left(\gamma - \frac{2\pi}{3}\right) \end{pmatrix} \begin{pmatrix} N_U \\ N_V \\ N_W \end{pmatrix} \quad (4)$$

If the numbers of turns of the respective teeth are determined by three-phase-to-two-phase conversion represented by expression (4), magnetic fluxes linking with the windings are also subjected to the three-phase-to-two-phase conversion. In addition, the condition (2) is satisfied by this three-phase-to-two-phase conversion. This is because, according to a vector diagram (FIG. 14) for a magnetic flux of the spatial third order, it is evident that the phase is the same in the windings of three phases, and in this case, the magnetic flux is cancelled by the expression (4). Thus, it is observed that the condition (4) is satisfied by the three-phase-to-two-phase conversion, and the output windings of two phases has winding specifications for functioning as the rotation angel detection device. Then, an example in which γ and k are specifically assumed to be 0 and $(2/3)^{1/2}$, respectively, in expression (4) and the three-phase windings in FIG. 15 is subjected to the three-phase-to-two-phase conversion is shown in FIG. 16. However, a number is rounded off to the fourth decimal place. The realistic numbers of turns which are decided specifically on the basis of FIG. 16 are shown in FIGS. 17 and 18. Values obtained by multiplying the numbers of turns in FIG. 16 by 50 and 150 are indicated for excitation windings and output windings, respectively. In addition, FIG. 17 shows a case in which decimals are allowed for the number of turns (ideal case). FIG. 18 shows the case in which decimals are rounded off.

Figure 19:
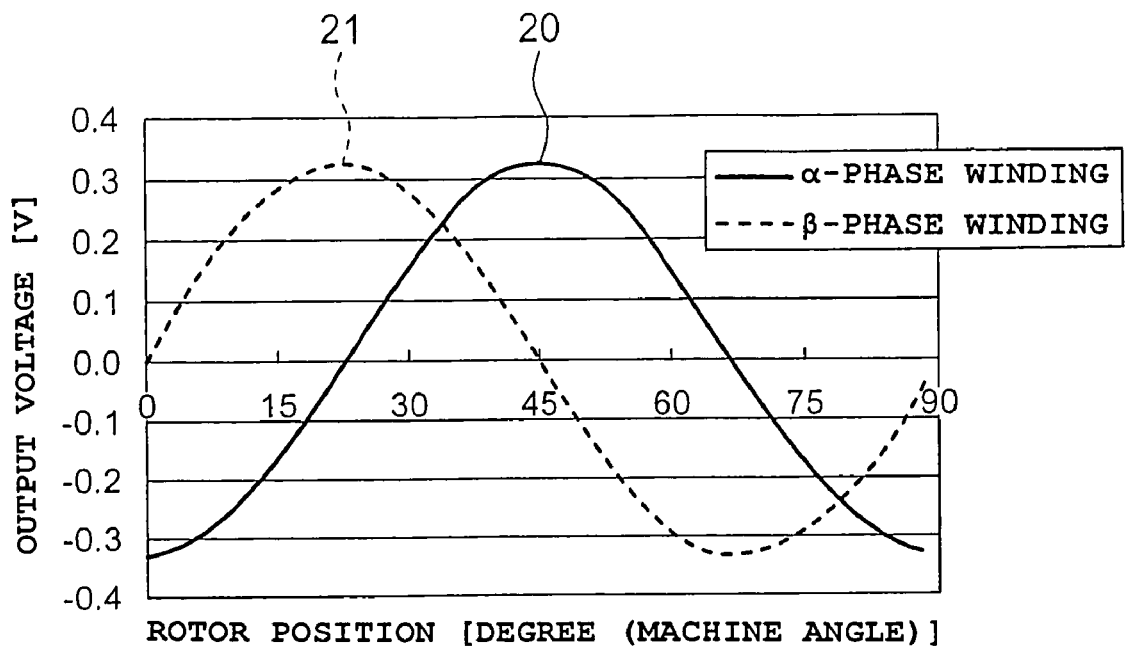
FIG. 19 is an explanatory view showing, in a graph format, output voltage waveforms of two phases (in the case of winding specifications of FIG. 17) in the rotation angle detection device in accordance with the second embodiment of the present invention.
Figure 20:
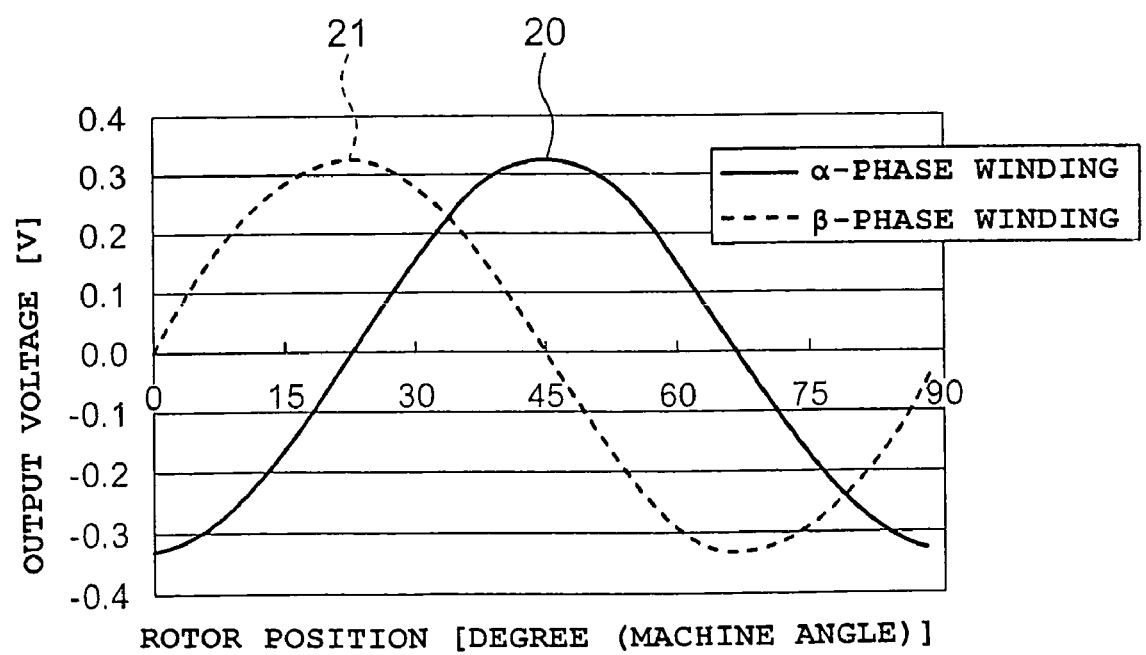
FIG. 20 is an explanatory view showing, in a graph format, output voltage waveforms of two phases (in the case of winding specifications of FIG. 18) in the rotation angle detection device in accordance with the second embodiment of the present invention.

Graphs of FIGS. 19 and 20 show how a voltage appearing in the output windings of two phases is changed by a rotor position when the winding specifications are set as shown in FIGS. 17 and 18 and excitation windings are excited by an AC current. In these figures, reference numeral 20 denotes an α phase winding and 21 denotes a β phase winding. In addition, the horizontal axis indicates a position of a rotor with a machine angle, and the vertical axis indicates a voltage generated in the output windings. Note that a minus sign of a voltage indicates that a phase is reversed with respect to an electric current of the excitation windings. In both cases, since voltages deviate by an electric angle of 90 degrees (machine angle of 22.5 degrees) from each other in a waveform of a sine wave shape, it was confirmed that the output windings operate as the rotation angle detection device with the shaft multiple angle of 4.

As described above, the output windings of two phases were obtained by imaginarily defining the windings of three phases and, then, subjecting the output windings to the three-phase-to-two-phase conversion. Accordingly, it was confirmed that the output windings operate as the rotation angle detection device. With such a constitution, since the number of phases decreases compared with a rotation angle detection device in which excitation is constituted by three phases, there is an effect in that a structure is simplified. Moreover, in the conventional examples, the number of teeth of a stator is sixteen in the case in which a shaft multiple angle is 4, whereas, according to the present invention, it is sufficient that the number of teeth is nine. In other words, since the rotation angle detection device can be constituted with the smaller number of teeth than the conventional examples even if the shaft multiple angle increases, there is also an effect in that the rotation angle detection device has satisfactory winding property and machining property and is excellent in mass productivity. Moreover, in the conventional examples, the number of turns may be changed in a sine wave shape. In this case, there are teeth to which only a small number of turns are applied. Since positioning of a nozzle of a winding machine for automatic winding, which takes time, is required to be performed for the teeth, there is a problem in that efficiency of winding work falls. In the present invention, as it is evident from FIGS. 17 and 18, there are a plurality of teeth to which output windings may not be applied, there is an effect in that efficiency of winding work can be improved. In addition, since multiphase windings, which are constituted imaginarily, can be constituted in three phases in constituting output windings of two phases, there is an effect in that specifications of output windings can be decided easily.

Figure 21:
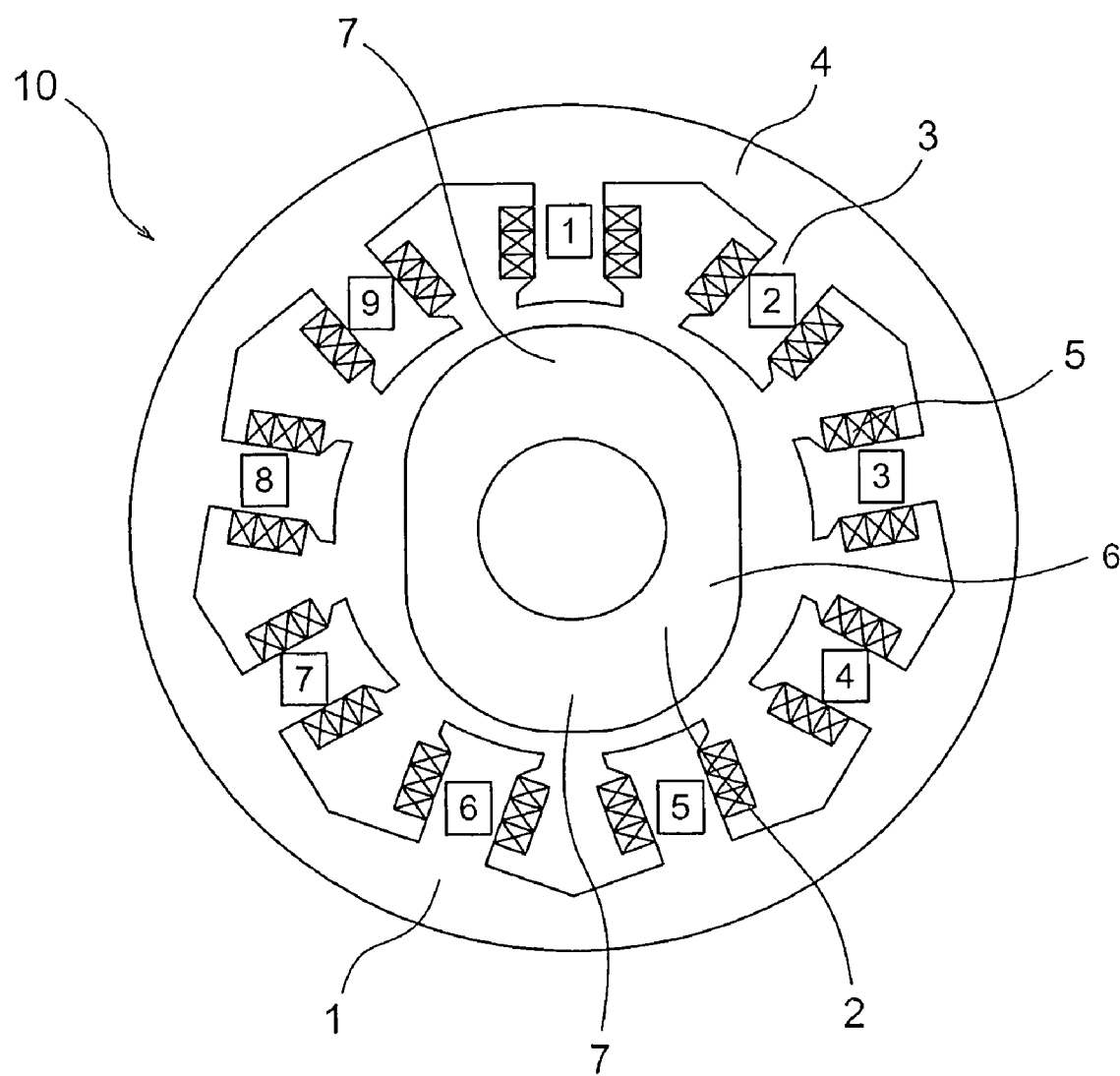
FIG. 21 is a diagram showing a modification of the structure of the rotation angle detection device in accordance with the second embodiment of the present invention.

Although only the case in which the shaft multiple angle is 4 is described above, other shaft multiple angles can also be structured in a similar procedure. FIG. 21 shows an example in which a shaft multiple angle is 2 and the number of teeth is nine. In FIG. 21, reference numeral 1 denotes a stator; 2, a rotor; 3, nine teeth provided in the stator 1; 4, a core of the stator 1; 5, a winding wound around the teeth 3; 6, a core of the rotor 2; 7, two salient poles provided in the core 6; and 10, a rotation angle detection device. When it is assumed that the number of poles of the excitation winding is 6, conditions for the excitation winding to operate as the rotation angle detection device are found as follows in the same manner in consideration of the fact that the shaft multiple angle is 2:

(1) pick up a magnetic flux of the spatial first order or the spatial fifth order; and
(2) do not pick up a magnetic flux of the spatial third order or an integer times thereof.

Figure 26:
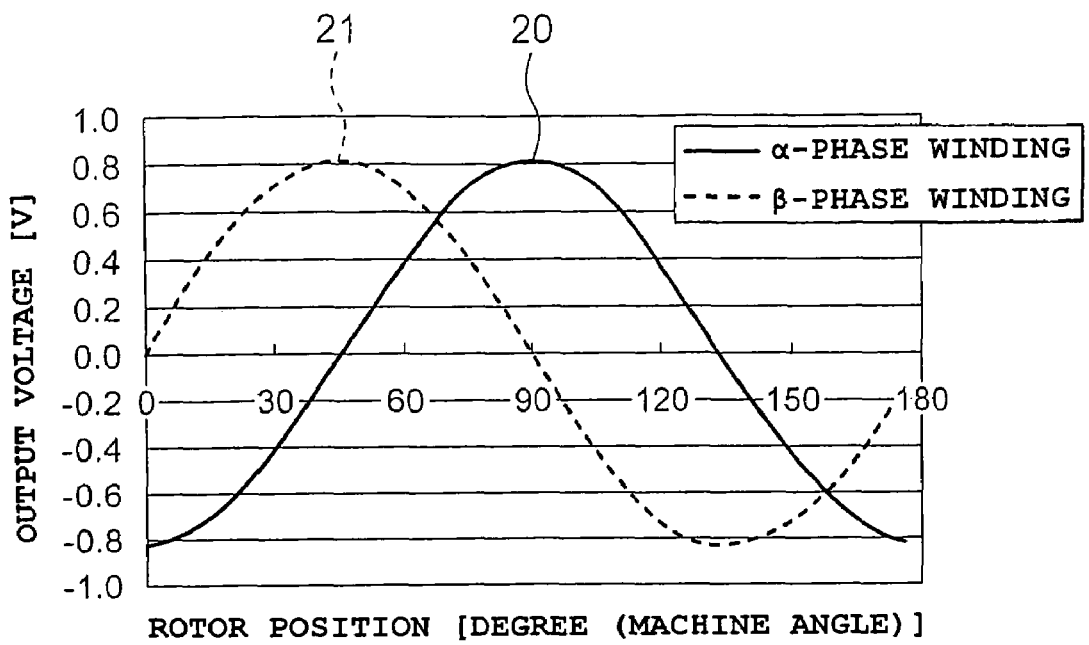
FIG. 26 is an explanatory view showing, in a graph format, output voltage waveforms of two phases (in the case of winding specifications of FIG. 24) in the rotation angle detection device in accordance with the second embodiment of the present invention.
Figure 27:
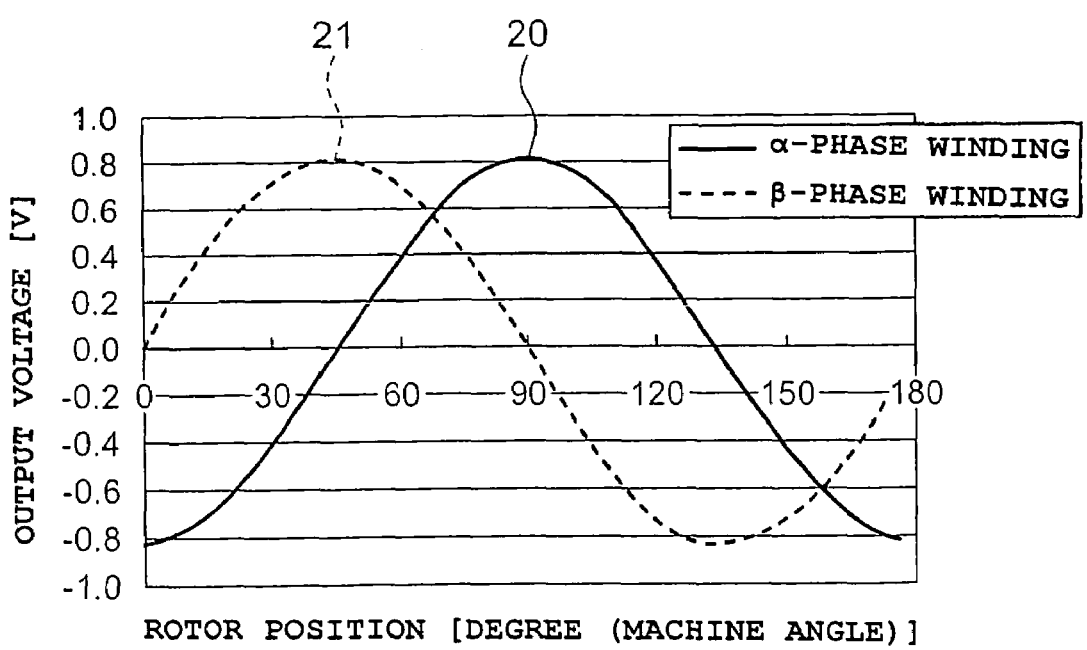
FIG. 27 is an explanatory view showing, in a graph format, output voltage waveforms of two phases (in the case of winding specifications of FIG. 25) in the rotation angle detection device in accordance with the second embodiment of the present invention.

FIG. 22 shows an example of three-phase windings satisfying the condition (1). FIG. 23 shows the three-phase windings which are subjected to the three-phase-to-two-phase conversion in accordance with expression (4) to satisfy the condition (2). Note that $\gamma=0$ and $k=(2/3)^{1/2}$. However, a number is rounded off to the fourth decimal place. The realistic numbers of turns which are decided specifically on the basis of FIG. 23 are shown in FIGS. 24 and 25. Values obtained by multiplying the numbers of turns in FIG. 23 by 50 and 150 are indicated for excitation windings and output windings, respectively. In addition, FIG. 24 shows a case in which decimals are allowed for the number of turns (ideal case), and decimals are rounded off in FIG. 25. Graphs of FIGS. 26 and 27 show how a voltage appearing in the output windings of two phases is changed by a rotor position when the winding specifications are set as shown in FIGS. 24 and 25 and excitation windings are excited by an AC current. In these figures, reference numeral 20 denotes an a phase winding and 21 denotes a phase winding. In addition, the horizontal axis indicates a position of a rotor with a machine angle, and the vertical axis indicates a voltage generated in the output windings. Note that a minus sign of a voltage indicates that a phase is reversed with respect to an electric current of the excitation windings. In both cases, since voltages deviate by an electric angle of 90 degrees (machine angle of 45 degrees) from each other in a waveform of a sine wave shape, it could be confirmed that the output windings operated as the rotation angle detection device with the shaft multiple angle of 2.

As described above, the output windings of two phases were obtained by imaginarily defining the windings of three phases, and then subjecting the output windings to the three-phase-to-two-phase conversion. Accordingly, it was confirmed that the output windings operate as the rotation angle detection device. With such a constitution, since the number of phases decreases compared with a rotation angle detection device in which excitation is constituted by three phases, there is obtained an effect in that a structure is simplified and a manufacturing process is facilitated. Moreover, in the conventional examples, the number of turns may be changed in a sine wave shape. In this case, there are teeth to which only a small number of turns are applied. Since positioning of a nozzle of a winding machine for automatic winding, which takes time, is required to be performed for the teeth, there is a problem in that efficiency of winding work falls. In the present invention, as it is evident from FIGS. 23, 24, and 25, there are a plurality of teeth to which output windings may not be applied, thus having an effect in that efficiency of winding work can be improved. In addition, since multiphase windings, which are constituted imaginarily, can be constituted in three phases in constituting output windings of two phases, there is an effect in that specifications of output windings can be decided easily.

In addition, in this embodiment, the number of stator teeth is an odd number. In the conventional examples, the number of teeth is an even number, and excitation windings are wound such that polarities are opposite in teeth adjacent to each other. In other words, the number of stator teeth and the number of excitation windings are identical. However, with the conventional winding method for excitation windings, polarities of windings adjacent to each other are identical in one part in such a pattern of windings in the case in which the number of teeth is an odd number. Thus, there is a problem in that well-balanced excitation windings are not obtained, which leads to an increase in a detecting position error. On the other hand, the excitation windings of this embodiment are constituted differently from the conventional examples, and are wound so as to form one pattern with three teeth. In other words, as shown in FIG. 41, the number of turns is 50 in the teeth number 1, and is −25 in the teeth numbers 2 and 3 (polarity is opposite to that of the teeth number 1). This pattern is repeated three times, that is, the number of times which is the same as a value of a divisor of 9 which is a value of the number of teeth (note that, although divisors of 9 are 1 and 3, a value of a divisor other than 1 is called a divisor here). With such a constitution, since the windings of the same pattern are repeated, the excitation windings can be wound with good balance. In general, even in the case where the number of teeth is an odd number, windings of the same pattern are repeated the number of times equivalent to a divisor of the number of teeth, whereby well-balanced excitation windings can be constituted. Accordingly, since magnetomotive forces of the excitation windings are generated with good balance, there is obtained an effect in that a detecting position error never increases.

Moreover, in FIG. 41, the number of turns is 50 in the teeth number 1, and is −25 in the teeth numbers 2 and 3, respectively and when the numbers of turns are totaled in the pattern (also taking into account the polarities), a total number of turns is calculated as 50−25−25=0. In this way, if the numbers of windings are set such that a total of the numbers is zero, a magnetomotive force of the spatial $0^{th}$ order is not generated when an electric current flows to the excitation windings. Accordingly, there is obtained an effect in that a magnetic flux of an unnecessary order is not generated in a gap and an increase in a detecting position error can be prevented.

Third Embodiment

Figure 28:
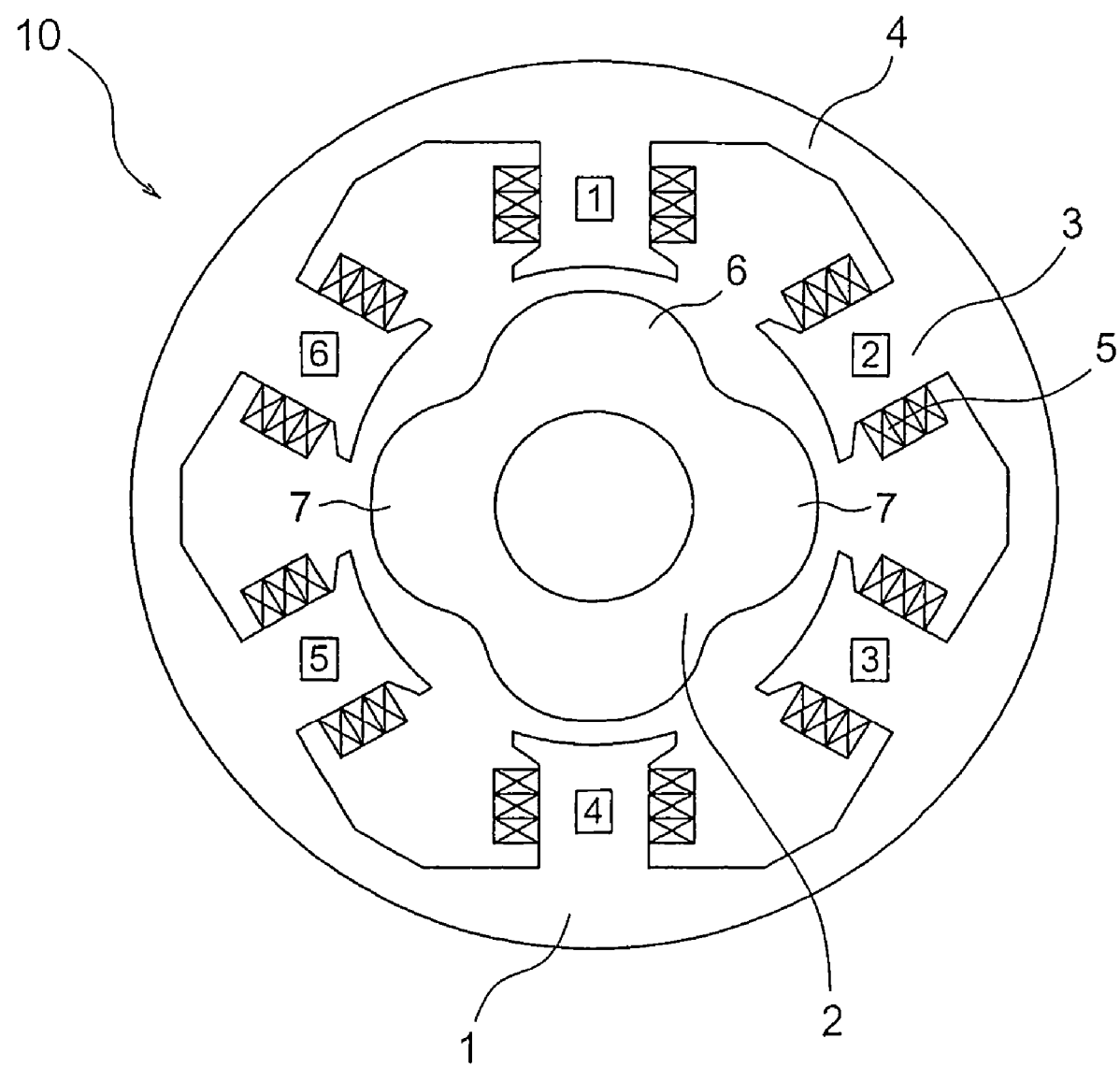
FIG. 28 is a diagram showing a structure of a rotation angle detection device in accordance with a third embodiment of the present invention.

FIG. 28 shows an example in which a shaft multiple angle is 4 and the number of teeth is six. In this embodiment, the number of teeth is set to 3n (n is a natural number; here, n=2). In FIG. 28, reference numeral 1 denotes a stator; 2, a rotor; 3, six teeth provided in the stator 1; 4, a core of the stator 1; 5, a winding wound around the teeth 3; 6, a core of the rotor 2; 7, four salient poles provided in the core 6; and 10, a rotation angle detection device.

When it is assumed that the number of poles of the excitation winding 5 is six, conditions for the excitation winding 5 to operate as the rotation angle detection device are found as follows in the same manner in consideration of the fact that the shaft multiple angle is 4:

(1) pick up a magnetic flux of the spatial first order or the spatial seventh order; and (2) do not pick up a magnetic flux of the spatial third order or an integer times thereof.

Figure 32:
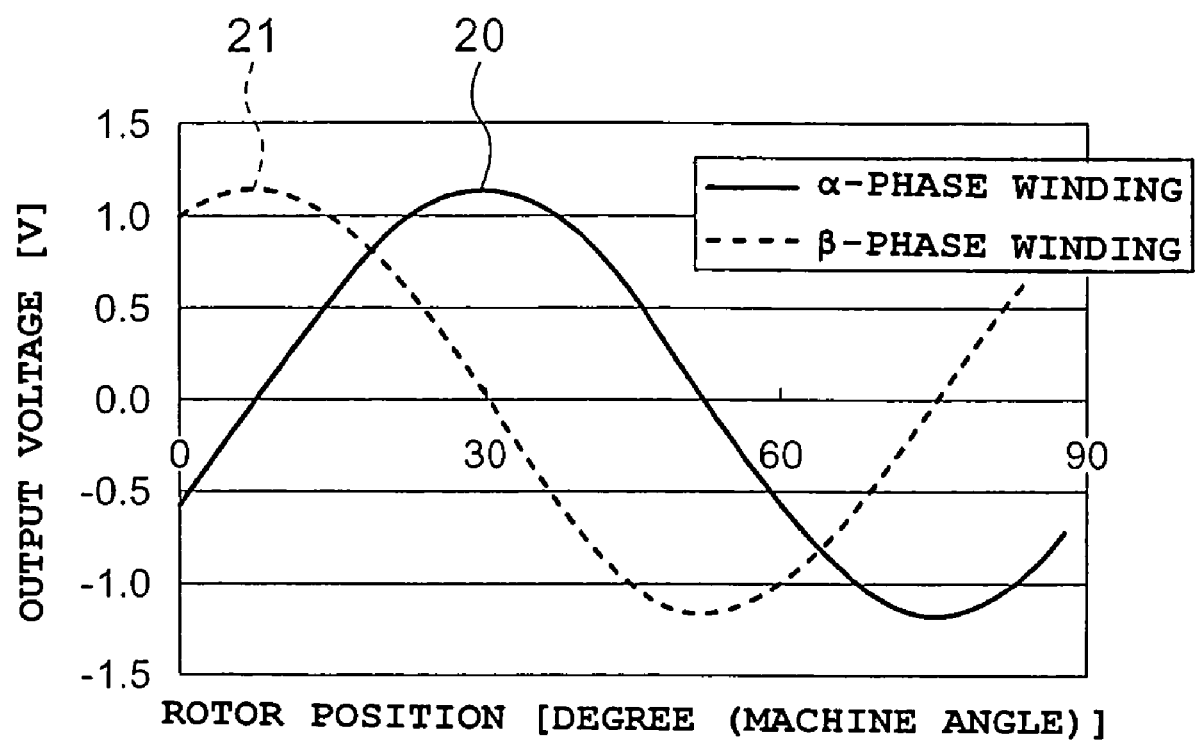
FIG. 32 is an explanatory view showing, in a graph format, output voltage waveforms of two phases in the rotation angle detection device in accordance with the third embodiment of the present invention.

FIG. 29 shows an example of three-phase windings satisfying the condition (1). FIG. 30 shows the three-phase windings which are subjected to the three-phase-to-two-phase conversion in accordance with expression (4) to satisfy the condition (2). Note that γ=0 and k=(⅔)$^{1/2}$. However, a number is rounded off to the fourth decimal place. The realistic numbers of turns which are decided specifically on the basis of FIG. 30 are shown in FIG. 31. Values obtained by multiplying the numbers of turns in FIG. 30 by 50 and 150 are indicated for excitation windings and output windings, respectively. Note that decimals are rounded off in FIG. 31. A graph of FIG. 32 shows how a voltage appearing in the output windings of two phases is changed by a rotor position when the winding specifications are set as shown in FIG. 31 and excitation windings are excited by an AC current. In this figure, reference numeral 20 denotes an α phase winding and 21 denotes a β phase winding. In addition, the horizontal axis indicates a position of a rotor with a machine angle, and the vertical axis indicates a voltage generated in the output windings. Note that a minus sign of a voltage indicates that a phase is reversed with respect to an electric current of the excitation windings. In both cases, since voltages deviate by an electric angle of 90 degrees (machine angle of 22.5 degrees) from each other in a waveform of a sine wave shape, it was confirmed that the output windings operate as the rotation angle detection device with the shaft multiple angle of 4.

Figure 33:
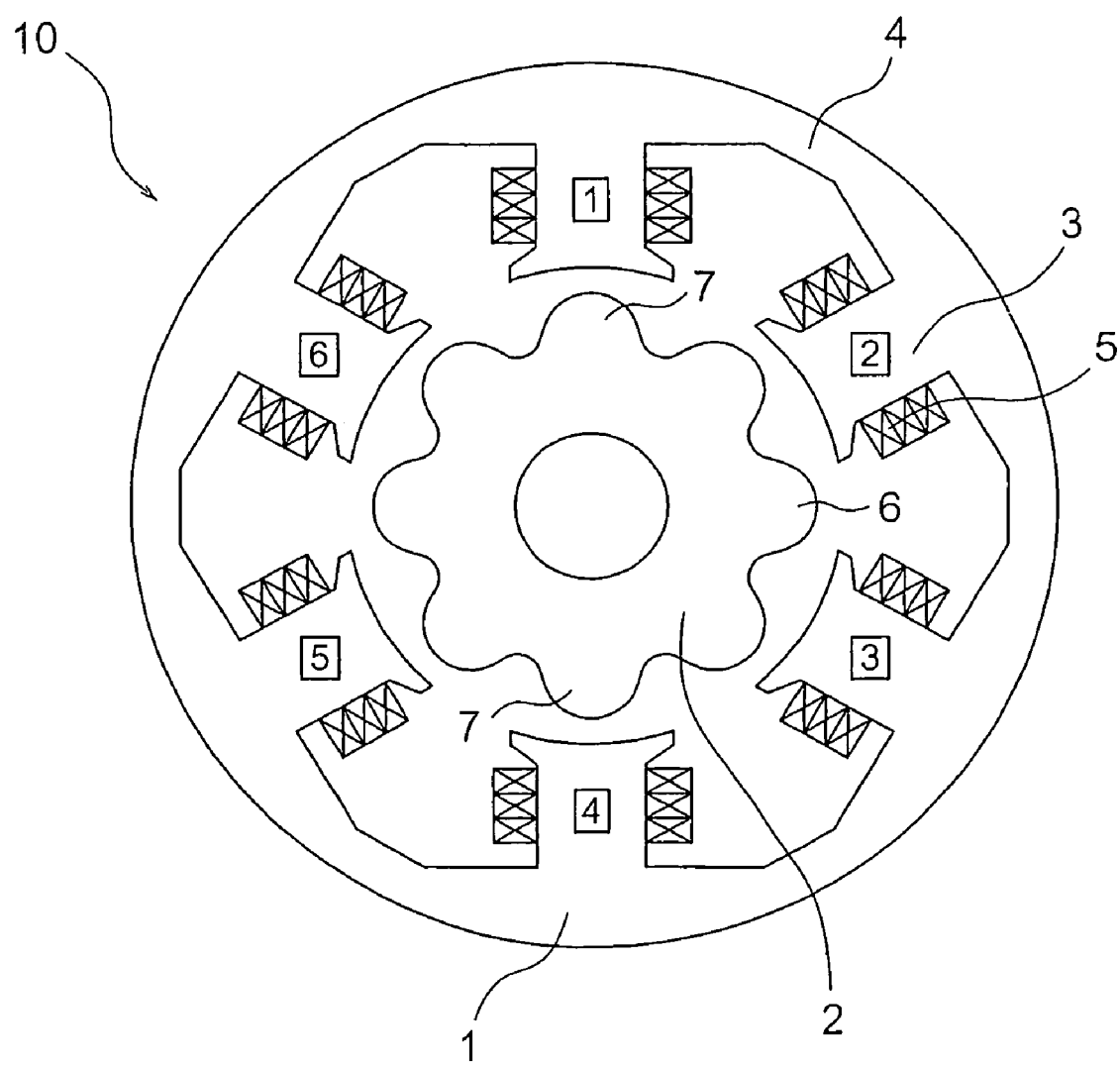
FIG. 33 is a diagram showing a modification of the structure of the rotation angle detection device in accordance with the third embodiment of the present invention.

Further, FIG. 33 shows an example in which a shaft multiple angle is 8 and the number of teeth is 6. In FIG. 33, reference numeral 1 denotes a stator; 2, a rotor; 3, six teeth provided in the stator 1; 4, a core of the stator 1; 5, a winding wound around the teeth 3; 6, a core of the rotor 2; 7, eight salient poles provided in the core 6; and 10, a rotation angle detection device.

When it is assumed that the number of poles of the excitation winding is 6, conditions for the excitation winding 5 to operate as the rotation angle detection device are found as follows in the same manner, paying attention to the fact that the shaft multiple angle is 8:

(1) pick up a magnetic flux of the spatial fifth order or the spatial eleventh order; and (2) do not pick up a magnetic flux of the spatial third order or an integer times thereof.

Figure 37:
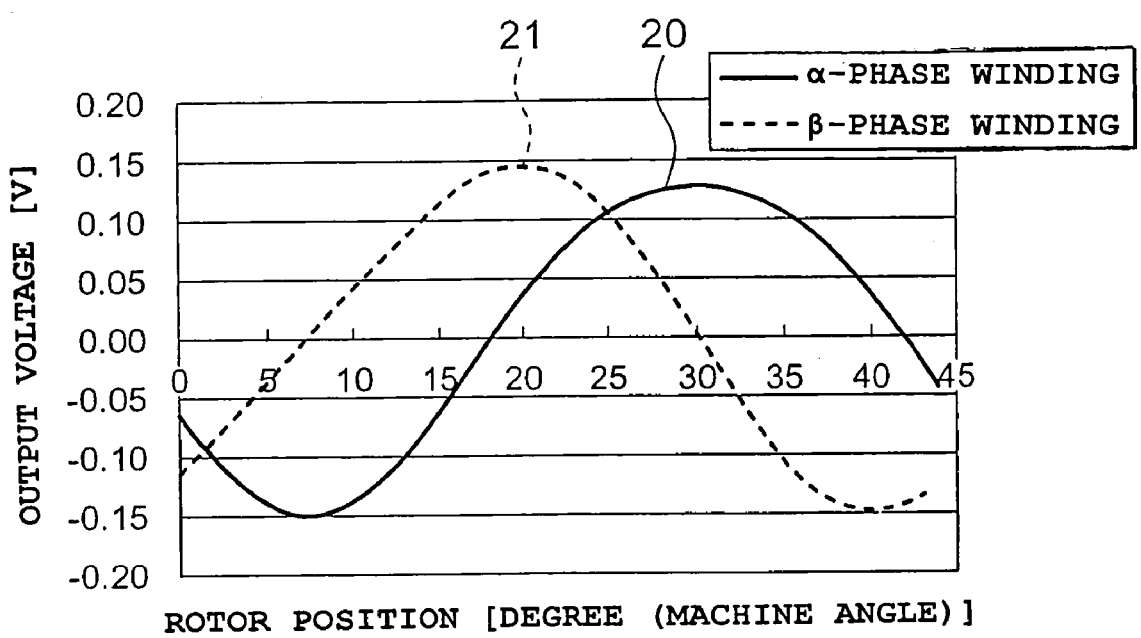
FIG. 37 is an explanatory view showing, in a graph format, output voltage waveforms of two phases in the rotation angle detection device in accordance with the third embodiment of the present invention.
Figure 38:
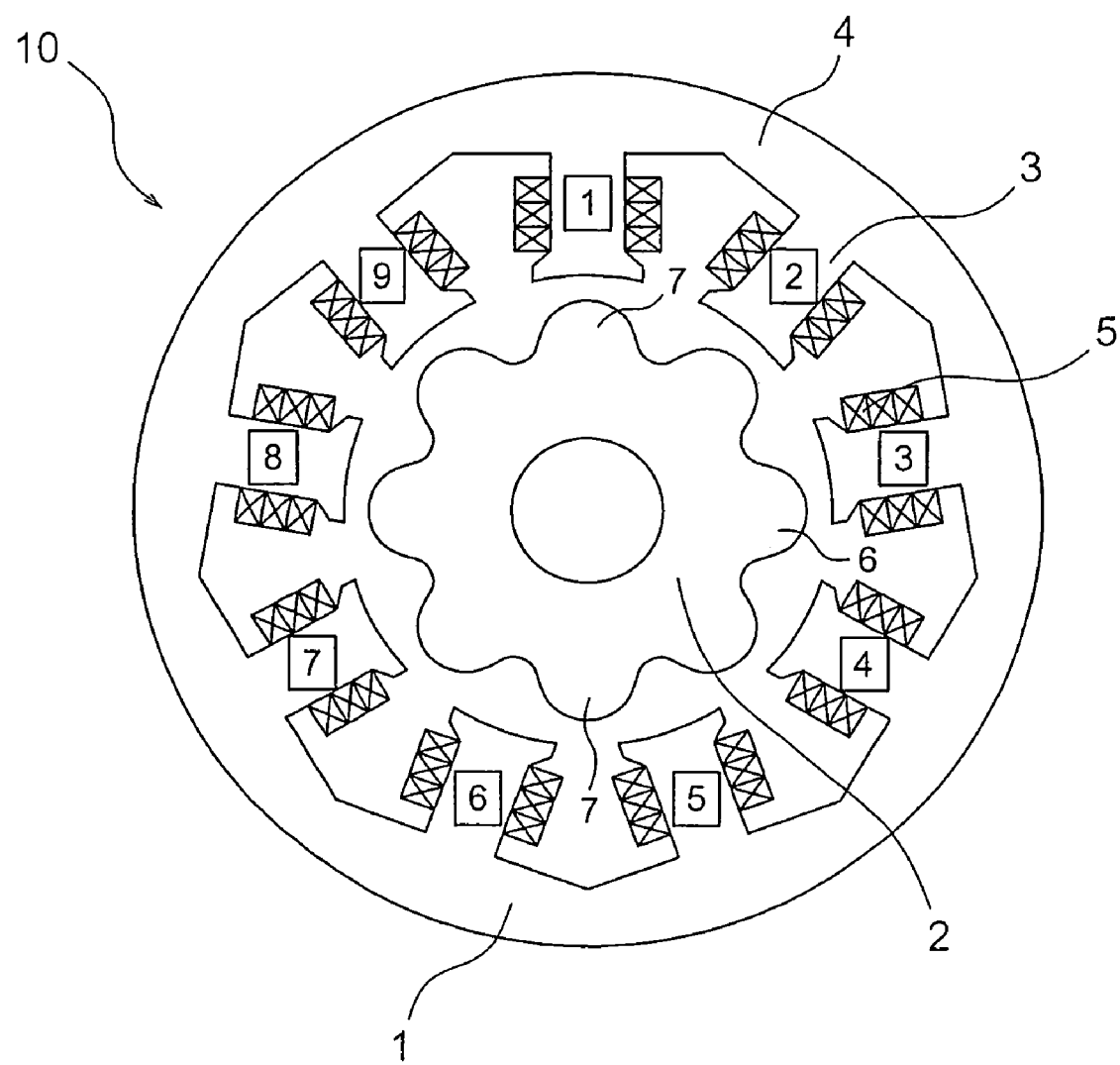
FIG. 38 is a diagram showing a structure of a rotation angle detection device in accordance with a fourth embodiment of the present invention.

FIG. 34 shows an example of three-phase windings satisfying the condition (1). FIG. 35 shows the three-phase windings which are subjected to the three-phase-to-two-phase conversion in accordance with expression (4) to satisfy the condition (2). Note that γ=0 and k=(⅔)$^{1/2}$. However, a number is rounded off to the fourth decimal place. The realistic numbers of turns which are decided specifically on the basis of FIG. 35 are shown in FIG. 36. Values obtained by multiplying the numbers of turns in FIG. 35 by 50 for excitation windings and 150 for output windings are indicated, respectively. Note that decimals are rounded off in FIG. 36. A graph of FIG. 37 shows how a voltage appearing in the output windings of two phases is changed by a rotor position when the winding specifications are set as shown in FIG. 38 and excitation windings are excited by an AC current. In this figure, reference numeral 20 denotes an α phase winding and 21 denotes a β phase winding. In addition, the horizontal axis indicates a position of a rotor with a machine angle, and the vertical axis indicates a voltage generated in the output windings. Note that a minus sign of a voltage indicates that a phase is reversed with respect to an electric current of the excitation windings. In both the cases, since voltages deviate by an electric angle of 90 degrees (machine angle of 11.25 degrees) from each other in a waveform of a sine wave shape, it could be confirmed that the output windings operated as the rotation angle detection device with the shaft multiple angle of 8. Note that the windings illustrated above are only examples. This is because there are other windings which satisfy the condition (1) and, in addition, the number of turns can also be changed according to γ and k.

As described above, the output windings of two phases were obtained by imaginarily defining the windings of three phases, and then subjecting the output windings to the three-phase-to-two-phase conversion. Accordingly, it was confirmed that the output windings operate as the rotation angle detection device. With such a constitution, since the number of phases decreases compared with a rotation angle detection device in which excitation is constituted by three phases, there is obtained an effect in that a structure is simplified and a manufacturing process is facilitated. Moreover, in the conventional examples, the number of teeth of a stator is 16 in the case in which a shaft multiple angle is 4, and the number of teeth of the stator is 32 when the shaft multiple angle is 8, whereas, according to the present invention, it is sufficient that the number of teeth is 6. In other words, since the rotation angle detection device can be constituted with the smaller number of teeth than the conventional examples even if the shaft multiple angle increases, there is also an effect in that the rotation angle detection device has satisfactory winding property and machining property and is excellent in mass productivity. Moreover, in the conventional examples, the number of turns may be changed in a sine wave shape. In this case, there are teeth to which only a small number of turns are applied. Since positioning of a nozzle of a winding machine for automatic winding, which requires time, is required to be performed for the teeth, there is a problem in that efficiency of winding work falls. In the present invention, as it is evident from FIGS. 31 and 36, there are a plurality of teeth to which output windings may not be applied, thus having an effect in that efficiency of winding work can be improved. In addition, since multiphase windings, which are constituted imaginarily, can be constituted in three phases in constituting output windings of two phases, there is an effect in that specifications of output windings can be decided easily.

Fourth Embodiment

FIG. 38 shows an example in which a shaft multiple angle is 8 and the number of teeth is nine. In FIG. 38, reference numeral 1 denotes a stator; 2, a rotor; 3, nine teeth provided in the stator 1; 4, a core of the stator 1; 5, a winding wound around the teeth 3; 6, a core of the rotor 2; 7, eight salient poles provided in the core 6; and 10, a rotation angle detection device.

When it is assumed that the number of poles of the excitation winding is six, conditions for the excitation winding 5 to operate as the rotation angle detection device are found as follows in the same manner, paying attention to the fact that the shaft multiple angle is 8:

(1) pick up a magnetic flux of the spatial fifth order or the spatial eleventh order; and
(2) do not pick up a magnetic flux of the spatial third order or an integer times thereof.

Figure 42:
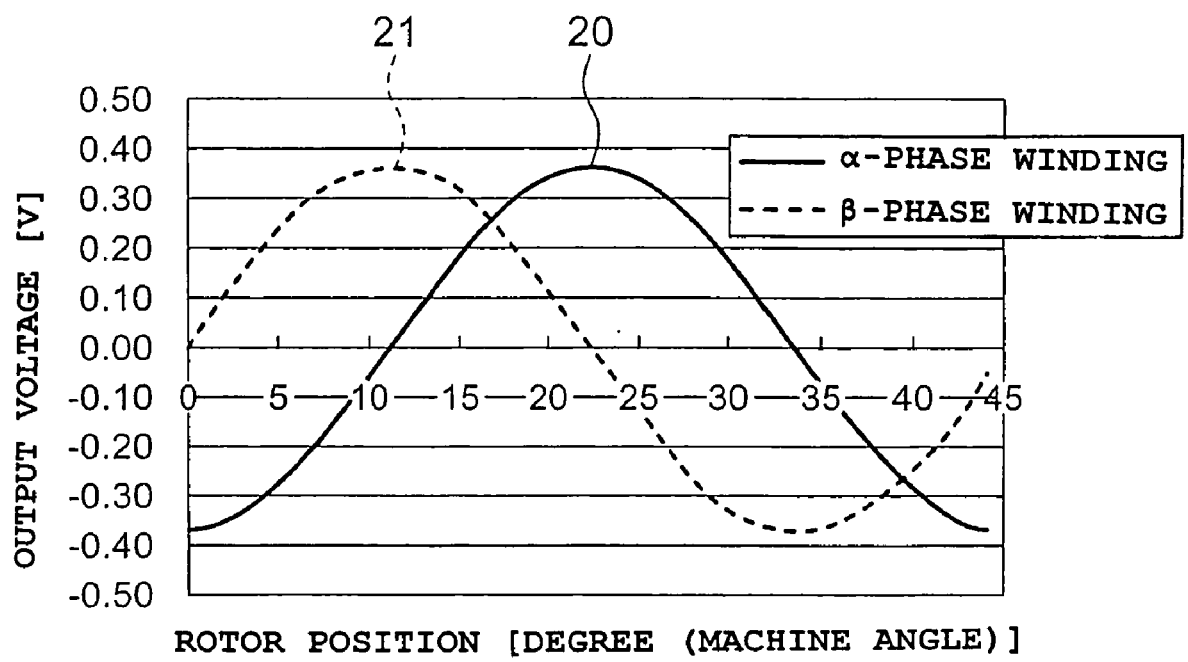
FIG. 42 is an explanatory view showing, in a graph format, output voltage waveforms of two phases in the rotation angle detection device in accordance with the fourth embodiment of the present invention.

FIG. 39 shows an example of three-phase windings satisfying the condition (1). FIG. 40 shows the three-phase windings which are subjected to the three-phase-to-two-phase conversion in accordance with expression (4) to satisfy the condition (2). Note that $\gamma=0$ and $k=(\frac{2}{3})^{1/2}$. However, a number is rounded off to the fourth decimal place. The realistic numbers of turns which are decided specifically on the basis of FIG. 40 are shown in FIG. 41. Values obtained by multiplying the numbers of turns in FIG. 40 by 50 for excitation windings and 150 for output windings are indicated, respectively. Note that decimals are rounded off in FIG. 41. A graph of FIG. 42 shows how a voltage appearing in the output windings of two phases is changed by a rotor position when the winding specifications are set as shown in FIG. 41 and excitation windings are excited by an AC current. In this figure, reference numeral 20 denotes an α phase winding and 21 denotes a β phase winding. In addition, the horizontal axis indicates a position of a rotor with a machine angle, and the vertical axis indicates a voltage generated in the output windings. Note that a minus sign of a voltage indicates that a phase is reversed with respect to an electric current of the excitation windings. In both the cases, since voltages deviate by an electric angle of 90 degrees (machine angle of 11.25 degrees) from each other in a waveform of a sine wave shape, it could be confirmed that the output windings operated as the rotation angle detection device with the shaft multiple angle of 8.

Note that the windings illustrated above are only examples. This is because there are other windings which satisfy the condition (1) and, in addition, the number of turns can also be changed according to γ and k.

As described above, the output windings of two phases were obtained by imaginarily defining the windings of three phases, and then, subjecting the output windings to the three-phase-to-two-phase conversion. Accordingly, it was confirmed that the output windings operate as the rotation angle detection device. With such a constitution, since the number of phases decreases compared with a rotation angle detection device in which excitation is constituted by three phases, there is obtained an effect in that a structure is simplified and a manufacturing process is facilitated. Moreover, in the conventional examples, the number of teeth of the stator is 32 when the shaft multiple angle is 8, whereas, according to the present invention, the number of teeth is nine. In other words, since the rotation angle detection device of the present invention can be constituted with the smaller number of teeth than the conventional examples even if the shaft multiple angle increases, there is also an effect in that the rotation angle detection device has satisfactory winding property and machining property and is excellent in mass productivity. Moreover, in the conventional examples, the number of turns may be changed in a sine wave shape. In this case, there are teeth to which only a small number of turns are applied. Since positioning of a nozzle of a winding machine for automatic winding, which requires time, is required to be performed for the teeth, there is a problem in that efficiency of winding work falls. In the present invention, as it is evident from FIG. 41, there are a plurality of teeth to which output windings may not be applied, thus having an effect in that efficiency of winding work can be improved. In addition, since multiphase windings, which are constituted imaginarily, can be constituted in three phases in constituting output windings of two phases, there is an effect in that specifications of output windings can be decided easily.

Fifth Embodiment

Figure 43:
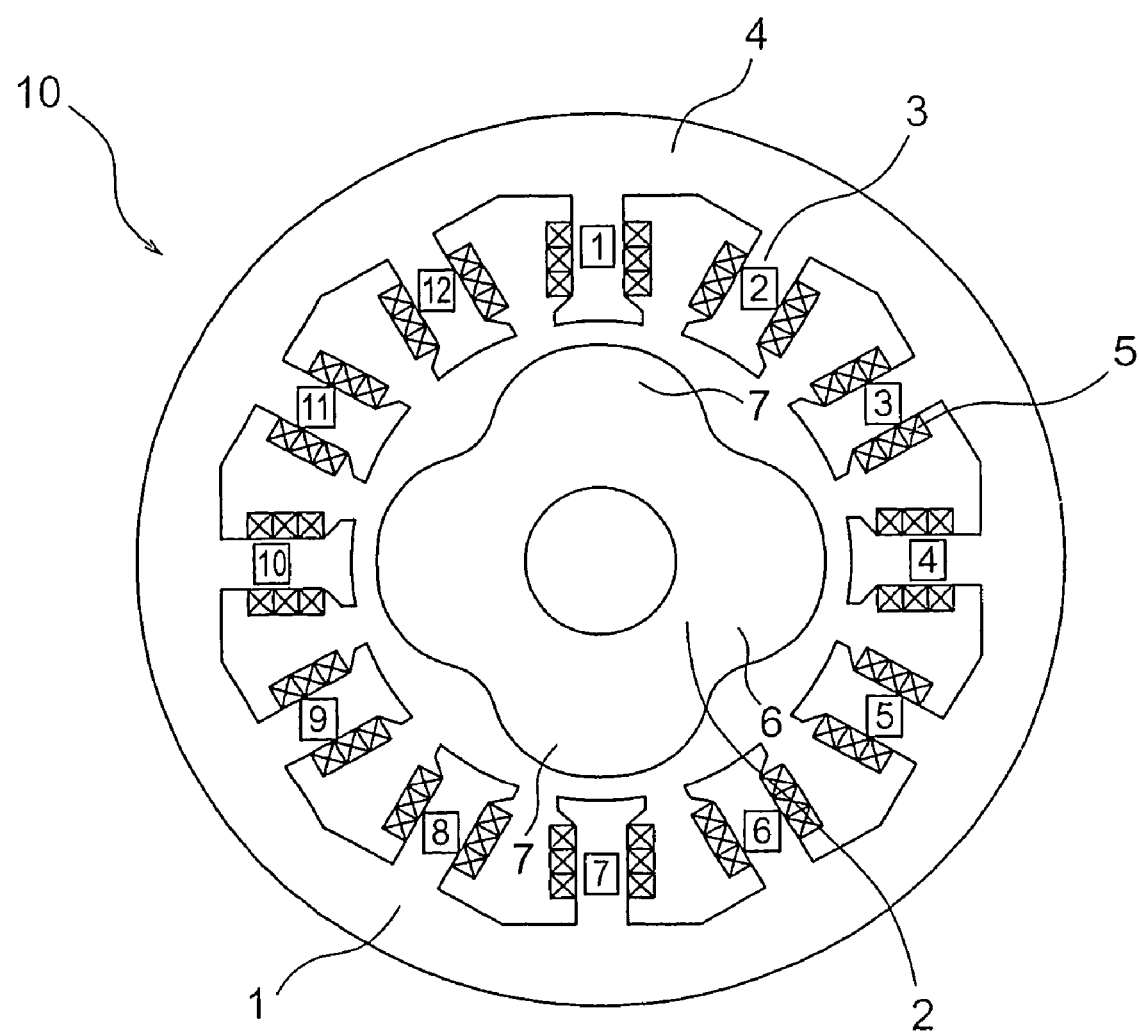
FIG. 43 is a diagram showing a structure of a rotation angle detection device in accordance with a fifth embodiment of the present invention.

FIG. 43 shows an example in which a shaft multiple angle is 4 and the number of teeth is 12. In FIG. 43, reference numeral 1 denotes a stator; 2, a rotor; 3, twelve teeth provided in the stator 1; 4, a core of the stator 1; 5, a winding wound around the teeth 3; 6, a core of the rotor 2; 7, four salient poles provided in the core 6; and 10, a rotation angle detection device.

When it is assumed that the number of poles of the excitation winding is 6, conditions for the excitation winding 5 to operate as the rotation angle detection device are found as follows in the same manner, paying attention to the fact that the shaft multiple angle is 4:

(1) pick up a magnetic flux of the spatial first order or the spatial seventh order; and
(2) do not pick up a magnetic flux of the spatial third order or an integer times thereof.

Figure 47:
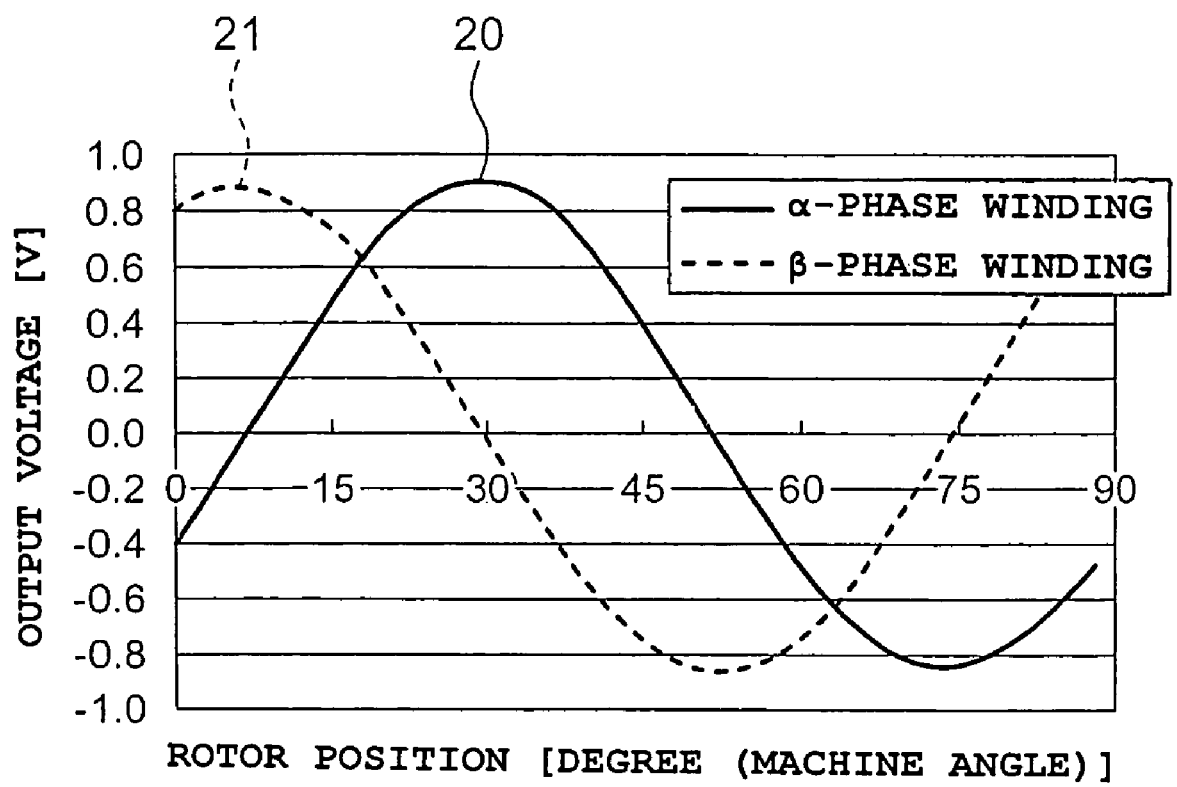
FIG. 47 is an explanatory view showing, in a graph format, output voltage waveforms of two phases in the rotation angle detection device in accordance with the fifth embodiment of the present invention.

FIG. 44 shows an example of three-phase windings satisfying the condition (1). FIG. 45 shows the three-phase windings which are subjected to the three-phase-to-two-phase conversion in accordance with expression (4) to satisfy the condition (2). Note that $\gamma=0$ and $k=(\frac{2}{3})^{1/2}$. However, a number is rounded off to the fourth decimal place. The realistic numbers of turns which are decided specifically on the basis of FIG. 45 are shown in FIG. 46. Values obtained by multiplying the numbers of turns in FIG. 45 by 50 for excitation windings and 150 for output windings are indicated, respectively. Note that decimals are rounded off in FIG. 46. A graph of FIG. 47 shows how a voltage appearing in the output windings of two phases is changed by a rotor position when the winding specifications are set as shown in FIG. 46 and excitation windings are excited by an AC current. In this figure, reference numeral 20 denotes an α phase winding and 21 denotes a β phase winding. In addition, the horizontal axis indicates a position of a rotor with a machine angle, and the vertical axis indicates a voltage generated in the output windings. Note that a minus sign of a voltage indicates that a phase is reversed with respect to an electric current of the excitation windings. In both the cases, since voltages deviate by an electric angle of 90 degrees (machine angle of 22.5 degrees) from each other in a waveform of a sine wave shape, it could be confirmed that the output windings operated as the rotation angle detection device with the shaft multiple angle of 4.

Figure 48:
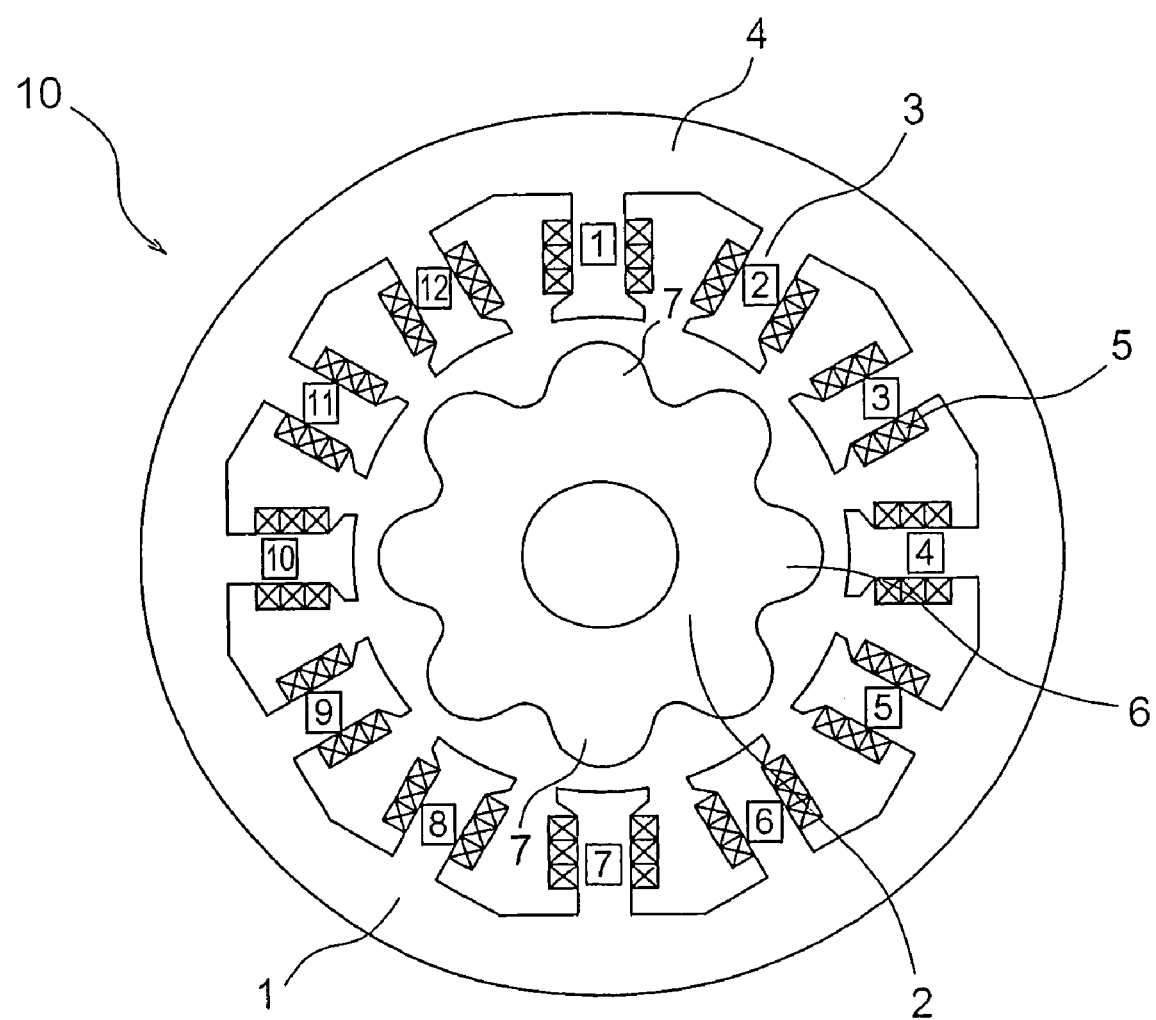
FIG. 48 is a diagram showing a modification of the structure of the rotation angle detection device in accordance with the fifth embodiment of the present invention.

FIG. 48 shows an example in which a shaft multiple angle is 8 and the number of teeth is 12. In FIG. 48, reference numeral 1 denotes a stator; 2, a rotor; 3, twelve teeth provided in the stator 1; 4, a core of the stator 1; 5, a winding wound around the teeth 3; 6, a core of the rotor 2; 7, eight salient poles provided in the core 6; and 10, a rotation angle detection device.

When it is assumed that the number of poles of the excitation winding is six, conditions for the excitation winding 5 to operate as the rotation angle detection device are found as follows in the same manner, paying attention to the fact that the shaft multiple angle is 8:

(1) pick up a magnetic flux of the spatial fifth order or the spatial eleventh order; and (2) do not pick up a magnetic flux of the spatial third order or an integer times thereof.

Figure 52:
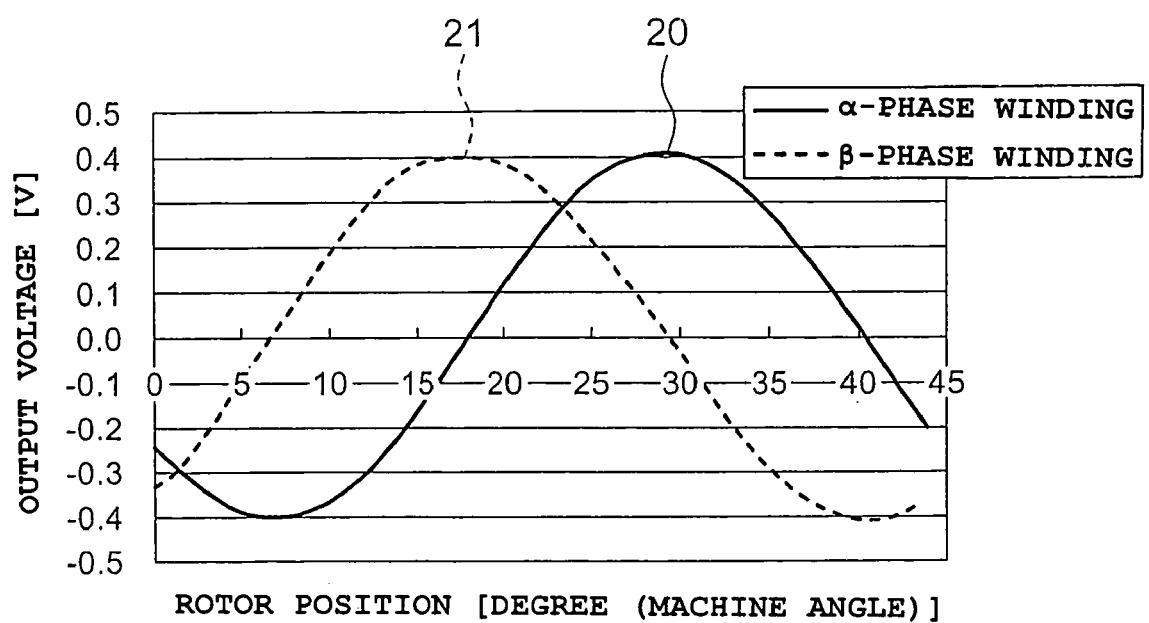
FIG. 52 is an explanatory view showing, in a graph format, output voltage waveforms of two phases in the rotation angle detection device in accordance with the fifth embodiment of the present invention (FIG. 48)

FIG. 49 shows an example of three-phase windings satisfying the condition (1). FIG. 50 shows the three-phase windings which are subjected to the three-phase-to-two-phase conversion in accordance with expression (4) to satisfy the condition (2). Note that γ=0 and k=(⅔)$^{1/2}$. However, a number is rounded off to the fourth decimal place. The realistic numbers of turns which are decided specifically on the basis of FIG. 50 are shown in FIG. 51. Values obtained by multiplying the numbers of turns in FIG. 50 by 50 for excitation windings and 150 for output windings are indicated, respectively. Note that decimals are rounded off in FIG. 51. A graph of FIG. 52 shows how a voltage appearing in the output windings of two phases is changed by a rotor position when the winding specifications are set as shown in FIG. 51 and excitation windings are excited by an AC current. In this figure, reference numeral 20 denotes an α phase winding and 21 denotes a β phase winding. In addition, the horizontal axis indicates a position of a rotor with a machine angle, and the vertical axis indicates a voltage generated in the output windings. Note that a minus sign of a voltage indicates that a phase is reversed with respect to an electric current of the excitation windings. Since voltages deviate by an electric angle of 90 degrees (machine angle of 11.25 degrees) from each other in a waveform of a sine wave shape, it could be confirmed that the output windings operated as the rotation angle detection device with the shaft multiple angle of 8.

Note that the windings illustrated above are only examples. This is because there are other windings which satisfy the condition (1) and, in addition, the number of turns can also be changed according to γ and k.

As described above, the output windings of two phases were obtained by imaginarily defining the windings of three phases, and then, subjecting the output windings to the three-phase-to-two-phase conversion. Accordingly, it was confirmed that the output windings operate as the rotation angle detection device. With such a constitution, since the number of phases decreases compared with a rotation angle detection device in which excitation is constituted by three phases, there is obtained an effect in that a structure is simplified and a manufacturing process is facilitated. Moreover, in the conventional examples, the number of teeth of a stator is 16 in the case in which a shaft multiple angle is 4, and the number of teeth of the stator is 32 when the shaft multiple angle is 8, whereas, according to the present invention, the number of teeth is twelve. In other words, since the rotation angle detection device of the present invention can be constituted with the smaller number of teeth than the conventional examples even if the shaft multiple angle increases, there is also an effect in that the rotation angle detection device has satisfactory winding property and machining property and is excellent in mass productivity. Moreover, in the conventional examples, the number of turns may be changed in a sine wave shape. In this case, there are teeth to which only a small number of turns are applied. Since positioning of a nozzle of a winding machine for automatic winding, which requires time, is required to be performed for the teeth, there is a problem in that efficiency of winding work falls. In the present invention, as it is evident from FIGS. 46 and 51, there are a plurality of teeth to which output windings may not be applied, thus having an effect in that efficiency of winding work can be improved. In addition, since multiphase windings, which are constituted imaginarily, can be constituted in three phases in constituting output windings of two phases, there is an effect in that specifications of output windings can be decided easily.

Sixth Embodiment

Figure 53:
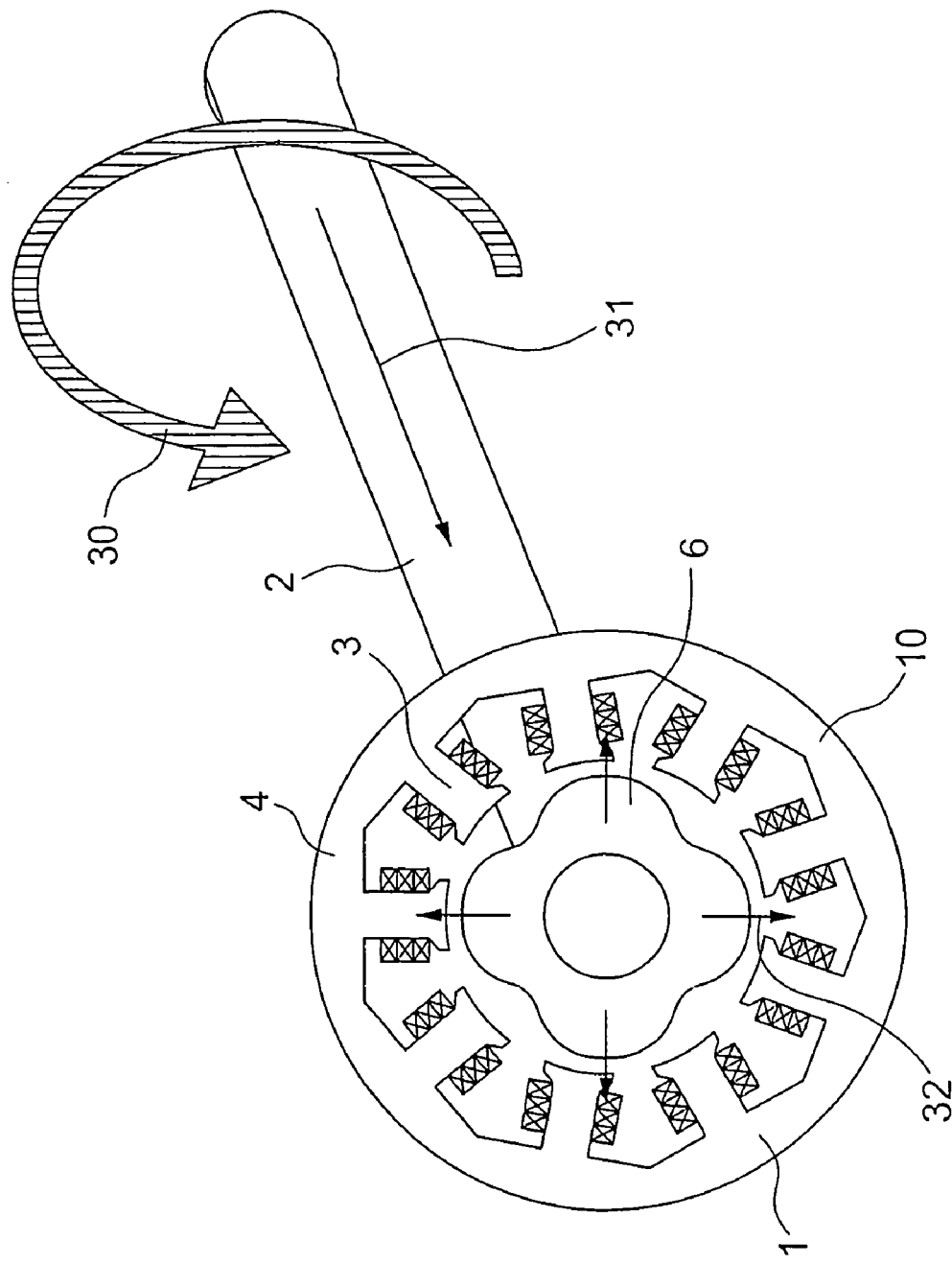
FIG. 53 is an explanatory view showing an example in which a magnetic flux of the same order as a shaft multiple angle in a rotation angle detection device in accordance with a sixth embodiment of the present invention.

The rotation angle detection device of the present invention operates as windings pick up a magnetic flux generated in a gap between a stator and a rotor. However, the rotation angle detection device may be affected by noises from the outside. Above all, a magnetic flux generated by a magnetomotive force of the spatial $0^{th}$ order may adversely affect the rotation angle detection device. For example, in a rotation angle detection device with a shaft multiple angle of 4, a magnetic flux of the spatial fourth order is generated. This will be described with reference to FIG. 53. In FIG. 53, reference numeral 30 denotes (a direction of) an electric current flowing around a shaft of the rotor 2; 31, (a direction of) a magnetomotive force generated by the electric current 30; and 32, a magnetic flux of the same order as a shaft multiple angle generated by the magnetomotive force 31. For example, as shown in FIG. 53, if the current 30 is flowing around the shaft of the rotor 2, the magnetomotive force 31 is generated in a direction parallel with the shaft of the stator 1. As a result, a magnetomotive force of the spatial $0^{th}$ order is generated between the rotor 2 and the stator 1 of the rotation angle detection device 10. On the other hand, the rotor 2 has salient poles of the same number as the shaft multiple angle. Thus, since permeance also changes in this order, a magnetic flux of the same order as the shaft multiple angle is generated in the gap by the magnetomotive force of the spatial $0^{th}$ order. In addition, a magnetic flux of the spatial $0^{th}$ order is also generated. In the conventional rotation angle detection device, there is a problem in that, when the winding provided in the stator 1 picks up this magnetic flux, a detecting position error increases, and an angle cannot be detected correctly. Thus, in this embodiment, output windings are constituted so as not to pick up a magnetic flux of a spatial order which is the same as a spatial order of a change in permeance of a rotor or a magnetic flux generated by a magnetomotive force of the spatial $0^{th}$ order to prevent the increase in a detecting position error.

Figure 54:
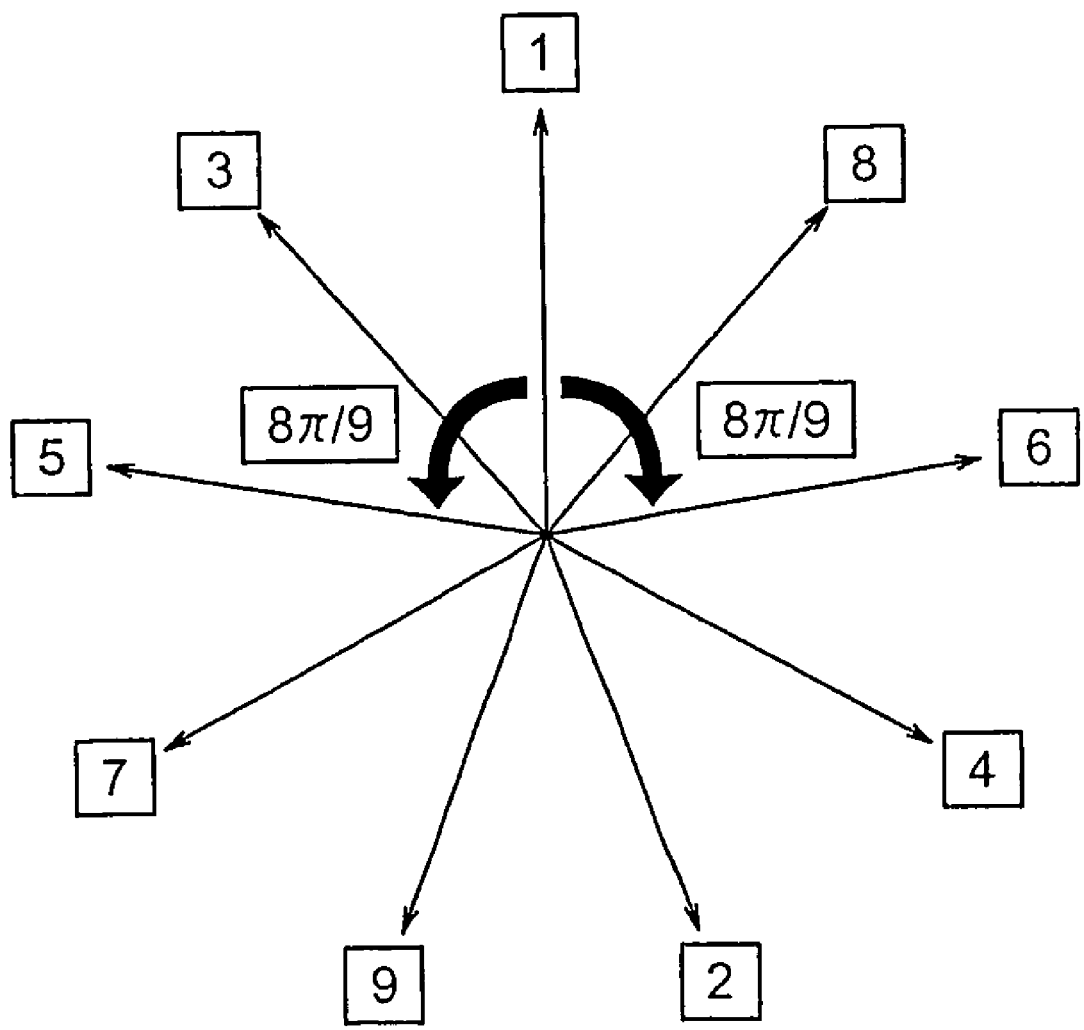
FIG. 54 is a vector diagram with respect to a magnetic flux of a spatial fourth order in the rotation angle detection device in accordance with the sixth embodiment of the present invention.

As a specific example, the rotation angle detection device of FIG. 11 in which the shaft multiple angle is 4 and the number of teeth is 9 will be described. In this case, since a magnetic flux of the spatial fourth order is generated by a magnetomotive force of the spatial $0^{th}$ order, it is sufficient to constitute a winding so as not to pick up the magnetic flux. FIG. 54 shows a vector diagram with respect to the spatial fourth order. First, three-phase windings are constituted imaginarily. It is sufficient to set a sum of vectors with respect to the spatial fourth order so as to be zero. In FIG. 15, a U phase winding is applied to the teeth numbers 1, 5, and 6, and polarities are made opposite in the teeth number 1 and the teeth numbers 5 and 6. Here, by further changing the number of turns for the teeth numbers 5 and 6 from that for the teeth number 1, it becomes possible not to pick up a magnetic flux of the spatial fourth order. More specifically, it is sufficient that there is the following relation between the number of turns $N_5=N_6$ of the teeth numbers 5 and 6 and the number of turns $N_1$ of the teeth number 1.

$$N_1 = -2\cos\frac{4\pi}{9} \qquad (5)$$

$$N_5 = -2\cos\frac{4\pi}{9} N_6$$

Figure 58:
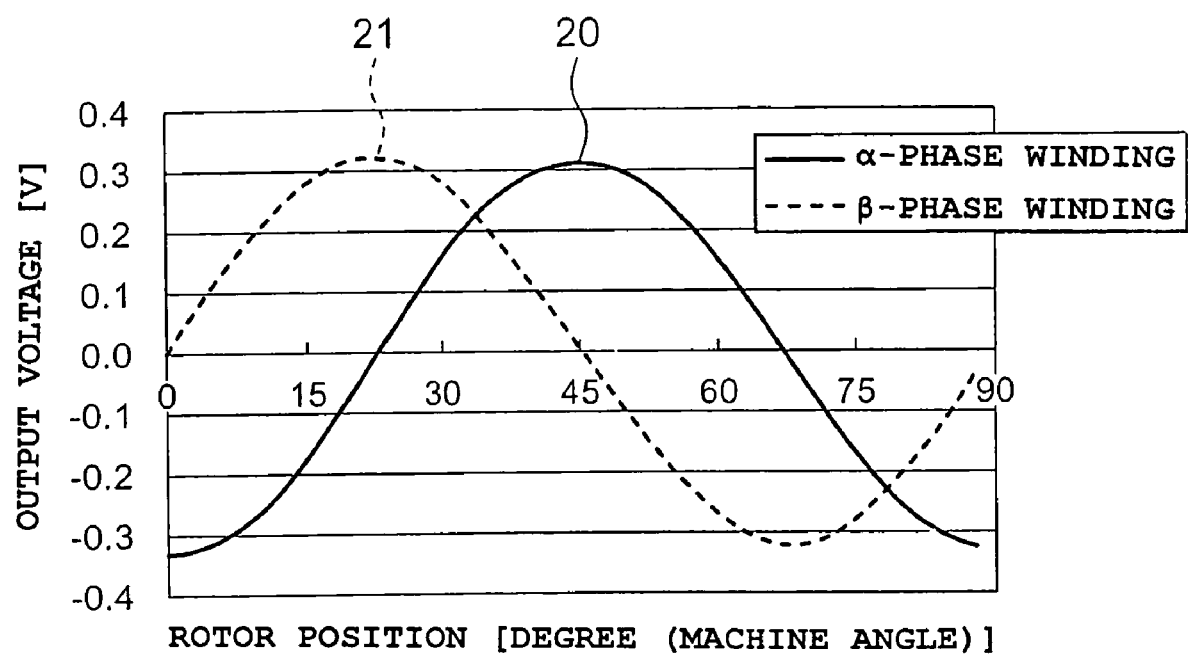
FIG. 58 is an explanatory view showing, in a graph format, output voltage waveforms of two phases in the rotation angle detection device in accordance with the sixth embodiment of the present invention.

A V phase winding and a W phase winding are set in the same manner to place the three windings in positions deviating by an electric angle of 120 degrees from each other, winding specifications of three phases can be decided. An example of the windings is shown in FIG. 55. Moreover, FIG. 56 shows windings obtained by further subjecting the windings to three-phase-to-two-phase conversion. The specific numbers of turns are as shown in FIG. 57. In addition, a total of the number of turns of the respective phases of output windings is zero taking into account polarities as well in the winding of FIG. 57. Thus, a magnetic flux of the spatial $0^{th}$ order is not picked up. A graph of FIG. 58 shows how an output voltage changes according to a rotor position in this case. In this figure, reference numeral 20 denotes an α phase winding and 21 denotes a β phase winding. Since voltages deviate by an electric angle of 90 degrees (machine angle of 22.5 degrees) from each other in a waveform of a sine wave shape, it could be confirmed that the output windings operated as the rotation angle detection device with the shaft multiple angle of 4.

In addition, the rotation angle detection device in which the shaft multiple angle is 4 and the number of teeth is 9 is described here. However, for example, it is sufficient to adapt the winding using a vector diagram so as not to pick up a magnetic flux of the spatial order which is the same as the shaft multiple angle. Thus, the effects can be obtained without depending upon the shaft multiple angle or the number of teeth.

As described above, the output windings of two phases were obtained by imaginarily defining the windings of three phases and, then, subjecting the output windings to the three-phase-to-two-phase conversion. Consequently, it was confirmed that the output windings operate as the rotation angle detection device. With such a constitution, since the number of phases decreases compared with a rotation angle detection device in which excitation is constituted by three phases, there is an effect in that a structure is simplified and a manufacturing process is facilitated. Moreover, in the conventional examples, the number of teeth of a stator is sixteen in the case in which a shaft multiple angle is 4, whereas, according to the present invention, the number of teeth is nine. In other words, since the rotation angle detection device of the present invention can be constituted with the smaller number of teeth than the conventional examples even if the shaft multiple angle increases, there is also an effect in that the rotation angle detection device has satisfactory winding property and machining property and is excellent in mass productivity. Moreover, in the conventional examples, the number of turns may be changed in a sine wave shape. In this case, there are teeth to which only a small number of turns are applied. Since positioning of a nozzle of a winding machine for automatic winding, which takes time, is required to be performed for the teeth, there is a problem in that efficiency of winding work falls. In the present invention, as it is evident from FIG. 57, there are a plurality of teeth to which output windings may not be applied, thus having an effect in that efficiency of winding work can be improved. In addition, since multiphase windings, which are constituted imaginarily, can be constituted in three phases in constituting output windings of two phases, there is an effect in that specifications of output windings can be decided easily.

Moreover, in this embodiment, the output windings are constituted such that output windings of two phases do not pickup a specific component of a magnetic flux of the spatial order, which is the same as the spatial order of a change in permeance of a rotor, or of a magnetic flux which is generated by a magnetomotive force of the spatial $0^{th}$ order. Thus, there is also an effect in that an increase in a detecting position error is prevented.

Seventh Embodiment

In the above-mentioned embodiments, a shape of a rotor is not specifically limited. However, a detecting position error may increase if a shape of a rotor is not appropriate. This embodiment relates to a rotation angle detection device which utilizes a component of variation in permeance caused by a shape of a rotor. Here, a detecting position error decreases if the component of variation in permeance has a sine wave shape and the rotation angle detection device becomes highly accurate.

Therefore, when an angle having a center of a rotation shaft of a rotor as the origin and representing a position on an external circumference of the rotor is θ, if permeance between an internal circumference of a stator and the external circumference of the rotor is as follows including a direct current component in the angle θ, the rotation angle detection device here functions as a highly accurate rotation angle detection device:

$$A+B\cos(M\theta) \qquad (6)$$

provided that A and B are positive constants and A>B, and M is a shaft multiple angle of the rotation angle detection device. If the shape of the rotor is set such that a gap length in the position of the angle θ is as follows from the fact that the gap length is in inverse proportion to permeance and from expression (6), a pulsation component of permeance of the gap takes a sine wave shape, and a highly accurate rotation angle detection device can be realized:

$$\frac{1}{A + B\cos(M\theta)} \quad (7)$$

Therefore, according to this embodiment, the same effects as the first to the sixth embodiments can be obtained, and there is also an effect in that a detecting position error can be further reduced and a highly accurate rotation angle detection device can be realized by setting the numbers of turns of output windings as described in any of the first to sixth embodiments and forming the rotor in a shape determined by expression (7).

Eighth Embodiment

The rotation angle detection device of the present invention operates as windings pick up a magnetic flux generated in a gap between a stator and a rotor. However, when a rotation shaft of the rotor and a center of the stator deviate from each other, or when a center and the rotation shaft of the rotor deviate from each other, that is, when eccentricity or shaft deviation occurs, it is likely that the rotation angle detection device is affected by a magnetic flux component of a specific order and a detecting position error increases. An order of a magnetic flux caused by eccentricity or shaft deviation is, for example, as described below.

(Order of a Magnetomotive Force of Excitation)±1

The order of a magnetomotive force of excitation is a spatial order of a magnetomotive force generated by an electric current flowing through excitation windings. For example, if excitation is by six poles, the order of a magnetomotive force of excitation is 3. In this case, from the above expression.

3±1=2, 4

Thus, magnetic fluxes of the spatial second order and the spatial fourth order are generated. The conventional examples have a problem in that output windings may pick up a magnetic flux of an order generated by eccentricity in this way to cause an increase in a detecting position error. Thus, in this embodiment, a constitution of winding specifications which does not pick up a specific component of such a magnetic flux generated by eccentricity or shaft deviation will be described.

Figure 59:
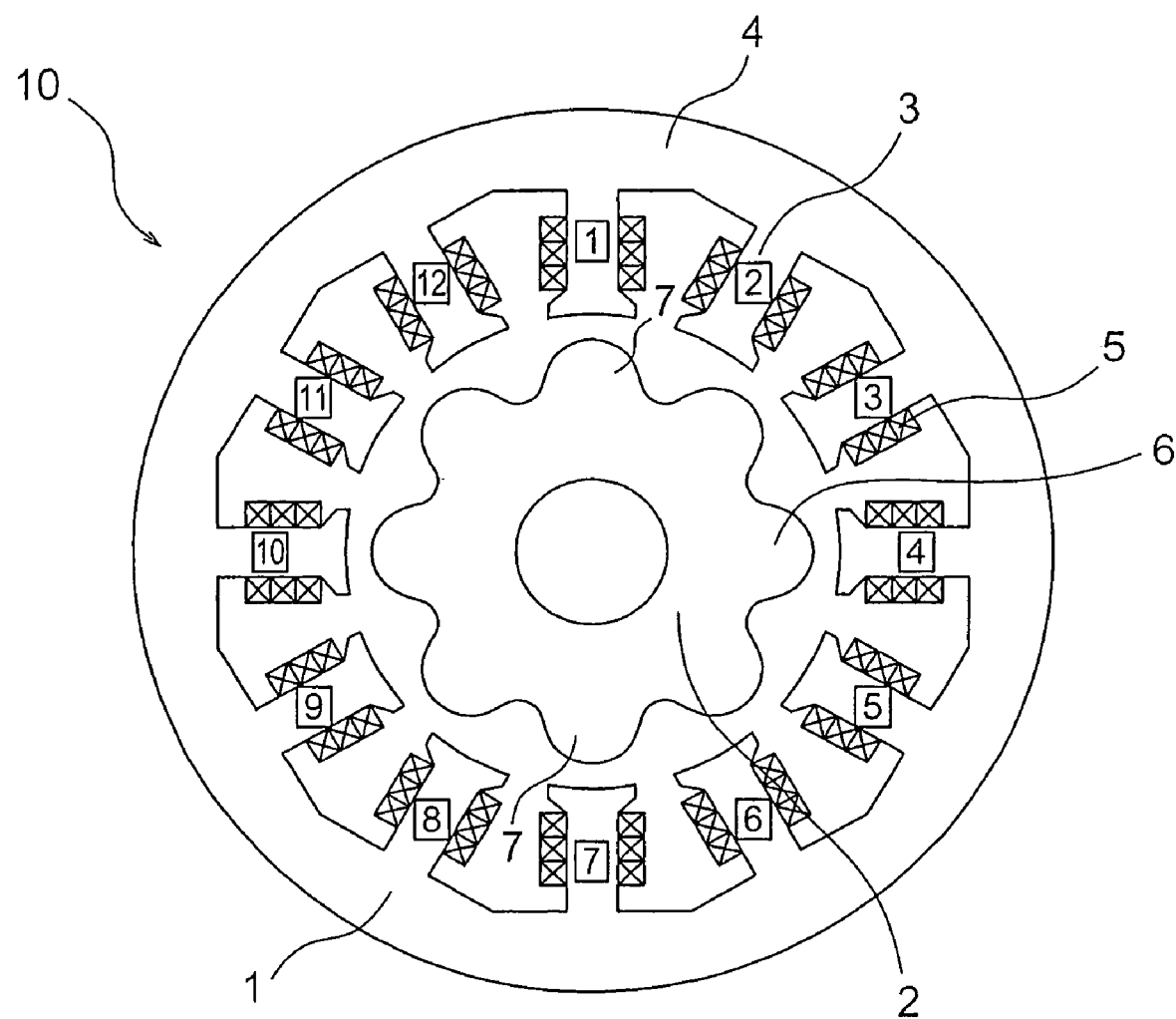
FIG. 59 is a diagram showing a structure of a rotation angle detection device in accordance with an eighth embodiment of the present invention.

FIG. 59 shows an example of a rotation angle detection device in which the number of teeth of a stator is twelve and a shaft multiple angle is 8. In FIG. 59, reference numeral 1 denotes a stator; 2, a rotor; 3, twelve teeth provided in the stator 1; 4, a core of the stator 1; 5, a winding wound around the teeth 3; 6, a core of the rotor 2; 7, eight salient poles provided in the core 6; and 10, a rotation angle detection device. As in the fifth embodiment, excitation windings are applied so as to have six poles. In this case, as already described, in the case in which the excitation windings have six poles, magnetic fluxes of the spatial second order and the spatial fourth order are generated in a gap due to eccentricity and shaft deviation. A constitution of output windings which do not pickup these two components will be considered using vector diagrams. Vector diagrams with respect to the spatial second order and the spatial fourth order are shown in FIGS. 60 and 61, respectively. The vector diagrams indicate in which phase the winding applied to the respective twelve teeth links with the magnetic fluxes of the spatial second order and the spatial fourth order. From the vector diagrams, it is seen that, for example, vectors of magnetic fluxes linking with a winding applied to teeth, which are represented by a relation of n, n+2, n+4 (n=1, 2, 3, . . . ) such as the teeth numbers 1, 3, and 5, deviate from each other by an electrical angle of 120 degrees and a sum of the vectors is zero. In constituting three-phase windings imaginarily, if a combination of vectors, in which a sum of the vectors of the magnetic fluxes of the spatial second order and the spatial fourth order is zero as described above, is selected, even two-phase output windings obtained by three-phase-to-two-phase conversion do not pickup the magnetic fluxes of the spatial second order and the spatial fourth order. In other words, it is considered that even if eccentricity or shaft deviation occurs, an increase in a detecting position error can be prevented since a specific component of a magnetic flux caused by the eccentricity or shaft deviation is not picked up.

Here, an example of specific winding specifications will be described. FIGS. 62, 63, and 64 show examples of three-phase windings which are constituted imaginarily. U, V, and W phases deviate by an electrical angle of 120 degrees with respect to each other, and as already described, the windings of the respective phases are constituted by applying a winding to teeth numbers represented by a relation of n, n+2, n+4 (n=1, 2, 3, . . . ) such as the teeth numbers 1, 3, and 5. In FIG. 62, the U phase is constituted by the teeth numbers 1, 3, and 5. In FIG. 63, the U phase is constituted by the teeth numbers 1, 3, and 5, and 2, 4, and 6. In FIG. 64, the U phase is constituted by the teeth numbers 1, 3, and 5, and 8, 10, and 12. The V phase and the W phase are constituted so as to deviate by an electrical angle of ±120 degrees with respect to the U phase. FIGS. 65, 66, and 67 show these windings converted into two-phase output windings according to the three-phase-to-two-phase conversion. Moreover, FIGS. 68, 69, and 70 show examples of specific numbers of windings.

Figure 71:
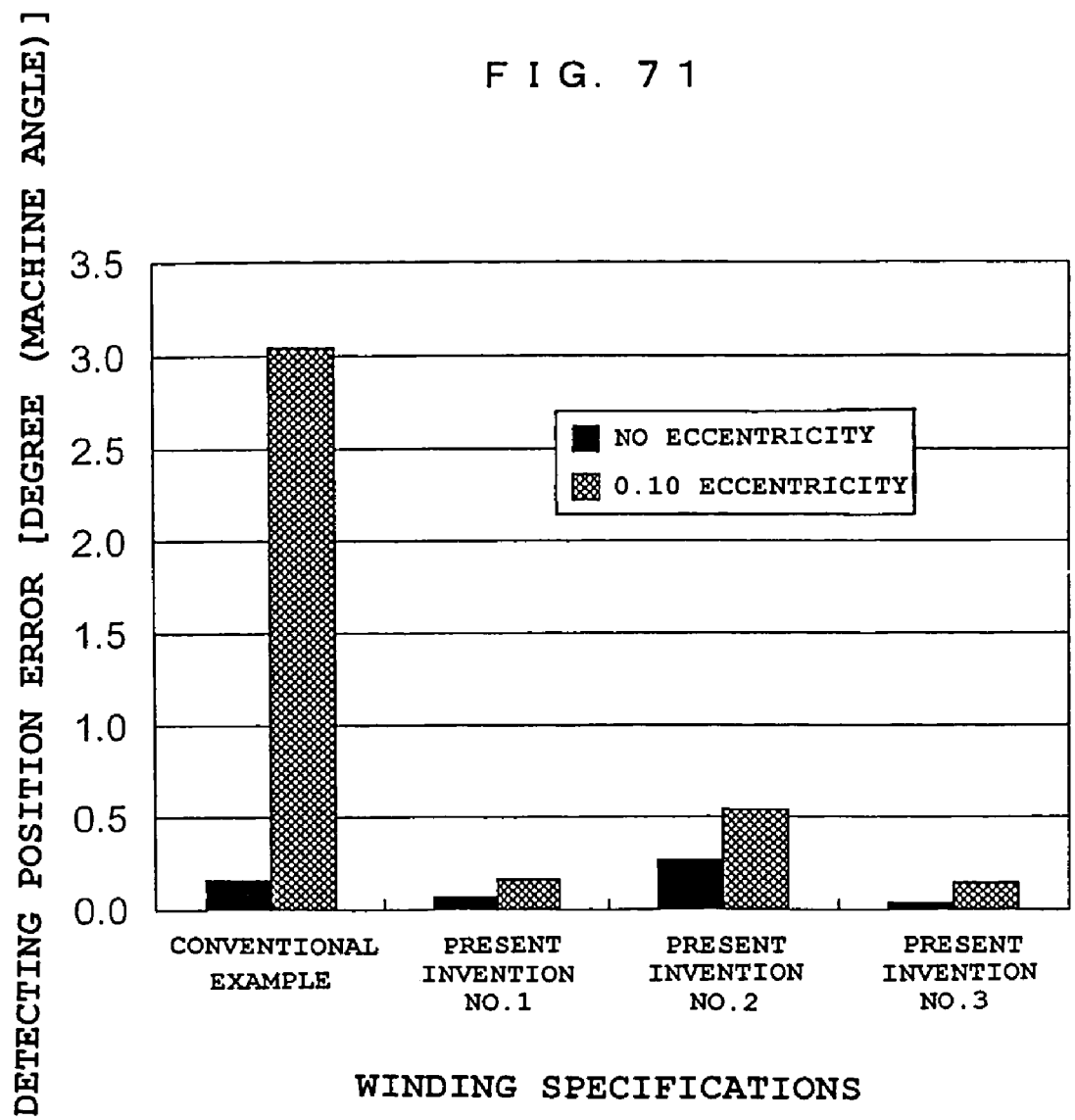
FIG. 71 is an explanatory view showing, in a graph format, a change in a detecting position error due to presence or absence of eccentricity in the rotation angle detection device in accordance with the eighth embodiment of the present invention.

In the rotation angle detection device with these three types of winding specifications (No. 1, No. 2, and No. 3), FIG. 71 shows a detecting position error for a case in which eccentricity of 0.10 mm is caused between a rotor and a stator and for an ideal case in which no eccentricity is caused. For comparison, a result of conventional winding specifications is also shown. From the results of the winding specifications, it is quite obvious that, in the conventional winding specification, a detecting position error extremely increases due to eccentricity, whereas, in the winding specifications of this embodiment, a detecting position error rarely increases even if eccentricity occurs, and the rotation angle detection device functions as a more highly accurate rotation angle detection device than in the conventional examples.

Hereinabove, the examples of the rotation angle detection device in which the number of teeth of a stator is 12 and a shaft multiple angle is 8 is described. However, it is needless to mention that there are winding specifications with which the same effects can be obtained by the number of turns other than those described above, and the same effects can be obtained as long as output windings are constituted so as not to pick up a specific order component of a gap magnetic flux which is generated by eccentricity or shaft deviation, even with other number of teeth or shaft multiple angle.

As described above, in this embodiment, the same effects as the first to the seventh embodiments can be obtained. In addition, by adopting the constitution described in this embodiment as a constitution of output windings, an increase in a detecting position error can be prevented, since a specific component of a magnetic flux density is not picked up, which is generated when a rotation shaft of a rotor and a center of a stator deviate from each other, that is, when eccentricity or shaft deviation occurs. In addition, since a detecting position error due to an attaching position error, eccentricity, shaft deviation, or the like does not increase, there is also an effect in that cost for improvement of attaching position accuracy can be reduced. In addition, in the winding specifications described here, even if a shaft multiple angle increases, a rotation angle detection device can be constituted by reducing the number of teeth of a rotor compared with the conventional examples. It is needless to mention that this feature realizes an effect in that the rotation angle detection device has satisfactory winding property and machining property and is excellent in mass productivity. Moreover, in the conventional examples, the number of turns may be changed in a sine wave shape. In this case, there are teeth to which only a small number of turns are applied. Since positioning of a nozzle of a winding machine for automatic winding, which requires time, is required to be performed for the teeth, there is a problem in that efficiency of winding work falls. In the present invention, as it is evident from FIGS. 68, 69 and 70 that there are a plurality of teeth to which output windings may not be applied, and there is an effect in that efficiency of winding work can be improved which is needless to mention.

Ninth Embodiment

In this embodiment, a case in which the rotation angle detection device described in the first to the eighth embodiments is used for various dynamo-electric machines such as a generator and a motor will be described. In the first to the eighth embodiments, it is stated that, by constituting a winding using multiphase-to-two-phase conversion, a rotation angle detection device can be obtained which requires only the smaller number of teeth of a stator than the conventional examples even if a shaft multiple angle increases, and is excellent in mass productivity. Since such a rotation angle detecting device is inexpensive and excellent in environmental resistance compared with an optical encoder, there is an effect in that a system which is inexpensive and excellent in environmental resistance can be established if it is used as a rotation angle sensor provided in a dynamo-electric machine such as a motor or a generator. For example, it is conceivable to incorporate the rotation angle detection device of the present invention in a belt driven ISG (Integrated Starter Generator).

Figure 72:
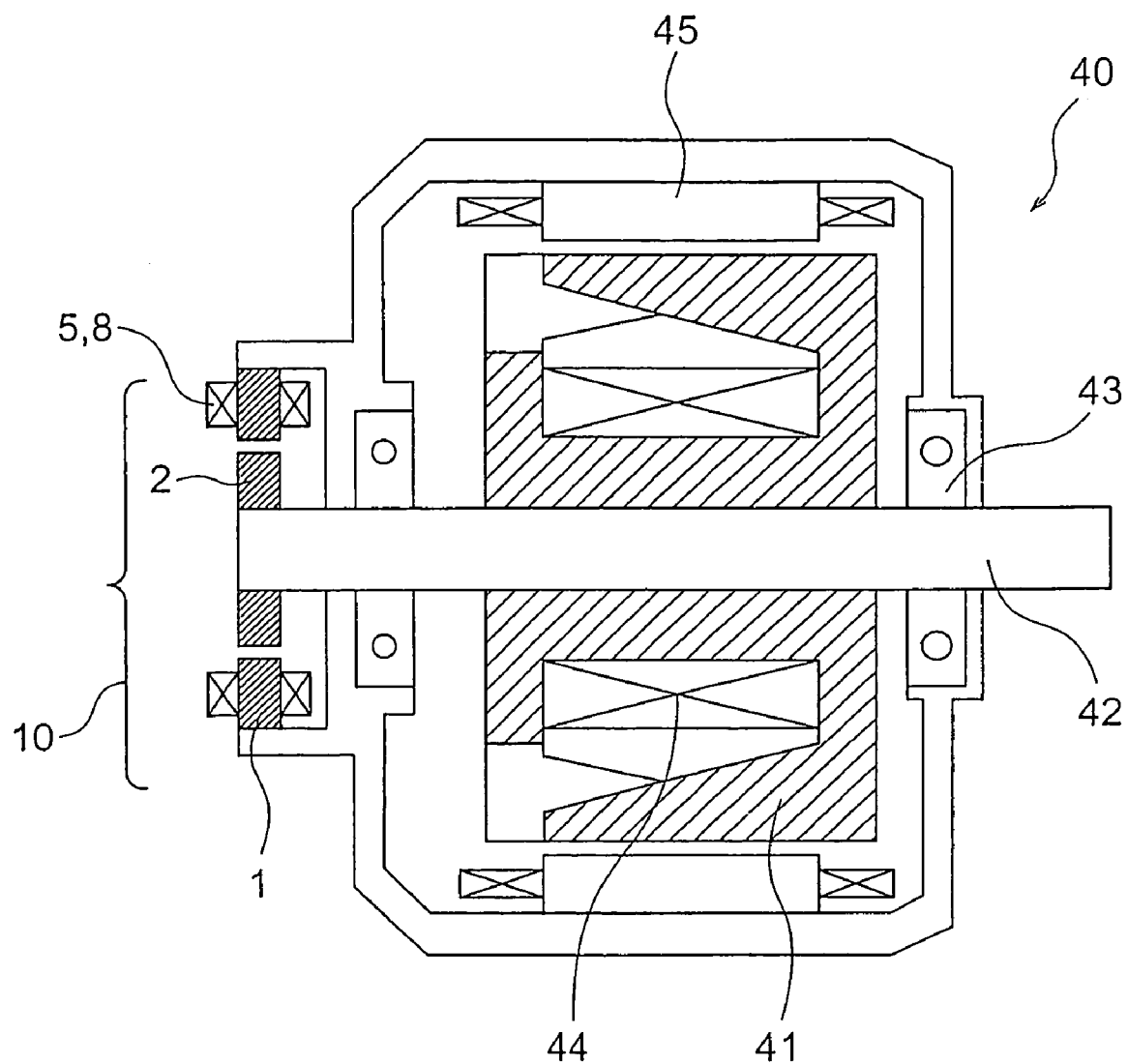
FIG. 72 is a diagram showing a structure of a ninth embodiment in which the rotation angle detection device in accordance with the first to eighth embodiments of the present invention is applied to a generator having a field core of a claw shape.

FIG. 72 shows a diagram in which the rotation angle detection device of the present invention is incorporated in a generator having a field core of a claw shape. In FIG. 72, reference numeral 1 denotes stator of a rotation angle detection device 10; 2, a rotor of the rotation angle detection device 10; 5, an excitation winding wound around teeth 3; 8, an output winding; 40, a generator (or a motor); 41, a field core of the generator 40; 42, a shaft; 43, a bearing; 44, a field winding (through which a field current flows); and 45, a stator of the generator 40.

Since a generator (also operating as a motor) is arranged in an engine room in a system of the belt driven ISG, temperature of the generator rises. Thus, an optical encoder is not suitable for the generator. In addition, the system becomes expensive if the optical encoder is used. Thus, if the rotation angle detection device of the present invention constituted by a core and a winding is used, a system which is excellent in environmental resistance, inexpensive, and highly accurate can be established. In addition, as described above, since a manufacturing process of the rotation angle detection device of the present invention is easy, a manufacturing process of a dynamo-electric machine using the rotation angle detection device is facilitated at least so much more for that.

Moreover, in the motor or the generator having a field core of a claw shape, a field electric current flows as shown in FIG. 53 to cause a magnetomotive force of the spatial $0^{th}$ order in a gap of the rotation angle detection device. Therefore, a magnetic flux of a spatial order which is the same as a shaft multiple angle is generated in the gap. In the conventional art, the output windings pick up this component, which leads to an increase in a detecting position error. However, as described in the sixth embodiment of the present invention, if a winding is constituted so as not to pick up a magnetic flux of an order which is the same as a shaft multiple angle, there is an effect in that the increase in a detecting position error can be prevented.

Here, only the motor or the generator provided with the field core of a claw shape is described. However, since a magnetomotive force of the spatial $0^{th}$ order may be generated in a general motor or generator as well, it is needless to mention that the increase in a detecting position error can be prevented by using the rotation angle detection device of the present invention in the motor or the generator.

Further, eccentricity of a rotor may be caused by a machining error such as an attaching position error. However, since the output windings are constituted so as not to pick up a specific order component of a gap magnetic flux generated by eccentricity or shaft deviation as described in the eighth embodiment, there is an effect in that an increase in a detecting position error due to eccentricity or shaft deviation can be prevented. Moreover, since a detecting position error is not increased by an attaching position error, eccentricity, shaft deviation, or the like, there is also an effect in that cost for improvement of attaching position accuracy can be reduced.

Note that, the first to the ninth embodiments are described with the rotation angle detection device which has the stator of output numbers of turns of two phases which can be obtained by converting the number of turns of multiphase defined imaginarily in advance into two phases, as an example. However, the present invention is not limited to that case, and the number of turns of multiphase may be defined actually rather than imaginarily and may be obtained by any other method. In that case, the same effects as described above can also be obtained.

INDUSTRIAL APPLICABILITY

As described above, the rotation angle detection device in accordance with the present invention is useful as a rotation angle detector which can be widely utilized not only for a belt driven ISG (Integrated Starter Generator) for vehicles but also for various other motors.

The invention claimed is:
1. A rotation angle detection device comprising:
 a stator provided with a one-phase excitation winding and two-phase output windings; and
 a rotor having salient poles,
 wherein the two-phase output windings are wound around a plurality of teeth of the stator, and respective numbers of turns of the two-phase output windings are obtained by using m-phase windings, where m is an integer of 3 or more, the m-phase windings being defined in advance to convert the numbers of turns of the m-phase windings into those of two-phase windings, wherein, when the number of teeth of the stator is an odd number, a winding pattern of the excitation winding is a pattern repeated by a number which is the same as a value of a divisor of the number of teeth.

2. A rotation angle detection device according to claim 1, wherein the number of teeth of the stator is nine, and a shaft multiple angle is 4 or 8.

3. A rotation angle detection device comprising:
a stator provided with a one-phase excitation winding and two-phase output windings; and
a rotor having salient poles,
wherein the two-phase output windings are wound around a plurality of teeth of the stator,
respective numbers of turns of the two-phase output windings are obtained by using m-phase windings, where m is an integer of 3 or more, the m-phase windinas being defined in advance to convert the numbers of turns of the m-phase windings into those of two-phase windings,
wherein the number of teeth of the stator is 3n, where n is a natural number, and
wherein the number of teeth of the stator is nine, and a shaft multipleangle is 4 or 8.

4. A rotation angle detection device comprising:
a stator provided with a one-phase excitation winding and two-phase output windings; and
a rotor having salient poles,
wherein the two-phase output windings are wound around a plurality of teeth of the stator,
respective numbers of turns of the two-phase output windings are obtained by using m-phase windings, where m is an integer of 3 or more, the m-phase windings being defined in advance to convert the numbers of turns of the m-phase windinas into those of two-phase windings,
wherein the number of teeth of the stator is 3n. where n is a natural number, and
wherein the number of teeth of the stator is twelve, and a shaft multiple angle is 4 or 8.

5. A rotation angle detection device comprising:
a stator provided with a one-phase excitation winding and two-phase output windings; and
a rotor having salient poles,
wherein the two-phase output windings are wound around a plurality of teeth of the stator,
respective numbers of turns of the two-phase output windings are obtained b usin m-phase windings, where m is an integer of 3 or more, the m-phase windings being defined in advance to convert the numbers, of turns of the m-phase windings into those of two-phase windings, and
wherein the numbers of turns of the two-phase output windings are adjusted such that the two-phase output windings do not pick up a magnetic flux of a spatial order which is the same as a spatial order of a change in permeance of the rotor or a magnetic flux of a spatial $0^{th}$ order.

6. A rotation angle detection device comprising:
a stator provided with a one-phase excitation winding and two-phase output windings; and
a rotor having salient poles,
wherein the two-phase output windings are wound around a plurality of teeth of the stator,
respective numbers of turns of the two-phase output windings are obtained by using m-phase windings, where m is an integer of 3 or more, the m-phase windings being defined in advance to convert the numbers of turns of the m-phase windings into those of two-phase windings, and
wherein the numbers of turns of the two-phase output windings are adjusted such that the two-phase output windings do not pick up a specific component of a gap magnetic flux which is generated when a rotation shaft of the rotor and a center of the stator deviate from each other.

7. A rotation angle detection device as in any one of claims 1, 3, 2, 4, 5 and 6,
wherein, when the numbers of turns of the m-phase windings, where m is an integer of 3 or more, are convened into two-phase windings, the conversion is performed according to the following expression:

$$N_{\alpha i} = k \sum_{n=1}^{m} N_{ni} \cos\left(\gamma + \frac{2(n-1)}{m}\pi\right)$$

$$N_{\beta i} = k \sum_{n=1}^{m} N_{ni} \sin\left(\gamma + \frac{2(n-1)}{m}\pi\right)$$

where γ represents an arbitrary constant, k represents an arbitrary constant excluding zero, a subscript i represents a number of a tooth, α and β represent two-phase windings after conversion, and n represents nth phase before conversion, $N_{\alpha i}$ and $N_{\beta i}$ represent the number of turns of the α-phase and β-phase windings in an ith tooth, respectively, and $N_{ni}$ represents the number of turns of nih phase winding of the ith tooth.

8. A dynamo-electric machine comprising:
a rotation angle detection device having a stator provided with a one-phase excitation winding and two-phase output windings and a rotor having salient poles,
wherein the two-phase output windings are wound around a plurality of teeth of the stator,
respective numbers of turns of the two-phase output windings are obtained by using m-phase windings, where m is an integer of 3 or more, the m-phase windings being defined in advance to convert the numbers of turns of the m-phase windings into those of two-phase windings, and
wherein, when the number of teeth of the stator is an odd number, a winding pattern of the excitation winding is a pattern repeated by a number which is the same as a value of a divisor of the number of teeth.

9. The dynamo-electric machine according to claim 8, wherein the number of teeth of the stator is nine, and a shaft multiple angle is 4 or 8.

10. A dynamo-electric machine comprising:
a rotation angle detection device having a stator provided with a one-phase excitation winding and two-phase output windings and a rotor having salient poles,
wherein the two-phase output windings are wound around a plurality of teeth of the stator, respective numbers of turns of the two-phase output windings are obtained by using m-phase windings, where m is an integer of 3 or more, the m-phase windings being defined in advance to convert the numbers of turns of the m-phase windings into those of two-phase windings, wherein the number of teeth of the stator is 3n, where n is a natural number, and wherein the nurnher of teeth of the stator is nine, and a shaft multiple angle is 4 or 8.

11. A dynamo-electric machine comprising:

a rotation angle detection device having a stator provided with a one-phase excitation winding and two-phase output windings and a rotor having salient poles, wherein the two-phase output windings are wound around a plurality of teeth of the stator, respective numbers of turns of the two-phase output windings are obtained by using m-phase windings, where m is an integer of 3 or more, the m-phase windings being defined in advance to convert the numbers of turns of the m-phase windings into those of two-phase windings, wherein the number of teeth of the stator is 3n, where n is a natural number, and wherein the number of teeth of the stator is twelve, and a shaft multiple angle is 4 or 8.

12. A dynamo-electric machine comprising:

a rotation angle detection device having a stator provided with a one-phase excitation winding and two-phase output windings and a rotor having salient poles, wherein the two-phase output windings are wound around a plurality of teeth of the stator, respective numbers of turns of the two-phase output windings are obtained by using m-phase windings, where m is an integer of 3 or more, the m-phase windings being defined in advance to convert the numbers of turns of the m-phase windings into those of two-phase windings, and wherein the numbers of turns of the two-phase output windings are adjusted such that the two-phase output windings do not pick up a magnetic flux of a spatial order which is the same as a spatial order of a change in permeance of the rotor or a magnetic flux of a spatial $0^{th}$ order.

13. A dynamo-electric machine comprising:

a rotation angle detection device having a stator provided with a one-phase excitation winding and two-phase output windings and a rotor having salient poles, wherein the two-phase output windings are wound around a plurality of teeth of the stator, respective numbers of turns of the two-phase output windings are obtained by using m-phase windings, where m is an integer of 3 or more, the m-phase windings being defined in advance to convert the numbers of turns of the m-phase windings into those of two-phase windings, and wherein the numbers of turns of the two-phase output windings we adjusted such that the two-phase output wlndings do not pick up a specific component of a gap magnetic flux which is generated when a rotation shaft of the rotor and a center of the stator deviate from each other.

14. A dynamo-electric machine as in any one of claims 8, 10-13, 9, wherein, when the numbers of turns of the m-phase windings, where m is an integer of 3 or more, are converted into two-phase windings, the conversion is performed according to the following expression:

$$N_{\alpha i} = k \sum_{n=1}^{m} N_{ni} \cos\left(\gamma + \frac{2(n-1)}{m}\pi\right)$$

$$N_{\beta i} = k \sum_{n=1}^{m} N_{ni} \sin\left(\gamma + \frac{2(n-1)}{m}\pi\right)$$

where $\gamma$ represents an arbitrary constant, k represents an arbitrary constant excluding zero, a subscript i represents a number of a tooth, $\alpha$ and $\beta$ represent two-phase windings after conversion, and n represents nth phase before conversion, $N_{\alpha i}$ and $N_{\beta i}$ represent the number of turns of the $\alpha$-phase and $\beta$-phase windings in an it tooth, respectively, and $N_{ni}$ represents the number of turns of nth phase winding of the ith tooth.

* * * * *